US008139070B1

(12) United States Patent
Ostiguy et al.

(10) Patent No.: US 8,139,070 B1
(45) Date of Patent: Mar. 20, 2012

(54) SYSTEMS FOR AND METHODS OF CONTEXT SWITCHING IN A GRAPHICS PROCESSING SYSTEM

(75) Inventors: Jean-Jacques Ostiguy, Montreal (CA); Jean-Francois Paquette, Lorraine (CA); Alain Bouchard, Notre-Dame-de-l'Ile-Perrot (CA)

(73) Assignee: Matrox Graphics, Inc. (CA)

( * ) Notice: Subject to any disclaimer, the term of this patent is extended or adjusted under 35 U.S.C. 154(b) by 905 days.

(21) Appl. No.: 11/866,481

(22) Filed: Oct. 3, 2007

(51) Int. Cl.
*G06T 1/00* (2006.01)
*G06T 1/20* (2006.01)

(52) U.S. Cl. ........................................ 345/522; 345/506
(58) Field of Classification Search .................. 345/522, 345/506
See application file for complete search history.

(56) References Cited

U.S. PATENT DOCUMENTS

| | | | | |
|---|---|---|---|---|
| 6,075,546 A * | 6/2000 | Hussain et al. | | 345/522 |
| 6,208,361 B1 * | 3/2001 | Gossett | | 345/536 |
| 6,674,841 B1 * | 1/2004 | Johns et al. | | 379/67.1 |
| 6,675,239 B1 | 1/2004 | Van Hook et al. | | |
| 6,731,288 B2 * | 5/2004 | Parsons et al. | | 345/502 |
| 6,782,432 B1 * | 8/2004 | Nelson et al. | | 710/1 |
| 6,952,214 B2 | 10/2005 | Naegle et al. | | |
| 7,420,572 B1 * | 9/2008 | Yue et al. | | 345/620 |
| 7,421,694 B2 * | 9/2008 | Gosalia et al. | | 718/104 |
| 7,512,773 B1 * | 3/2009 | Shebanow et al. | | 712/228 |
| 7,545,381 B2 * | 6/2009 | Huang et al. | | 345/522 |
| 7,580,040 B2 * | 8/2009 | Huang et al. | | 345/522 |
| 7,583,268 B2 * | 9/2009 | Huang et al. | | 345/506 |
| 7,673,304 B2 * | 3/2010 | Gosalia et al. | | 718/102 |
| 2003/0164830 A1 * | 9/2003 | Kent | | 345/505 |
| 2003/0164840 A1 * | 9/2003 | O'Driscoll | | 345/611 |
| 2007/0103474 A1 * | 5/2007 | Huang et al. | | 345/506 |
| 2007/0103475 A1 * | 5/2007 | Huang et al. | | 345/522 |
| 2007/0103476 A1 * | 5/2007 | Huang et al. | | 345/522 |
| 2007/0237086 A1 * | 10/2007 | Tulac et al. | | 370/244 |
| 2007/0283352 A1 * | 12/2007 | Degenhardt et al. | | 718/100 |
| 2009/0153571 A1 * | 6/2009 | Crow et al. | | 345/506 |
| 2009/0153573 A1 * | 6/2009 | Crow et al. | | 345/522 |

* cited by examiner

*Primary Examiner* — Daniel Washburn
(74) *Attorney, Agent, or Firm* — Lando & Anastasi, LLP

(57) ABSTRACT

In accordance with one embodiment a graphics processing system is configured to switch from a processing of a primitive associated with a first context to a processing of a command list associated with a second context where the primitive includes a plurality of regions. The system includes a plurality of processing modules and at least one module of the plurality of processing modules is configured to receive a request to switch to the second context. In one embodiment, the plurality of processing modules includes a first module that is configured to, following a receipt of the request by the at least one module, to complete a processing of at least one region selected from among the plurality of regions before interrupting the processing of the primitive prior to completion and processing at least a part of the command list associated with the second context; and a second module configured to provide data concerning the primitive to the first module following a processing of the primitive by the second module. The graphics processing system may also include a memory configured to save a state of the second module, where the state corresponds to the state of the second module when processing the primitive associated with the first context.

31 Claims, 12 Drawing Sheets

Figure 1: PRIOR ART

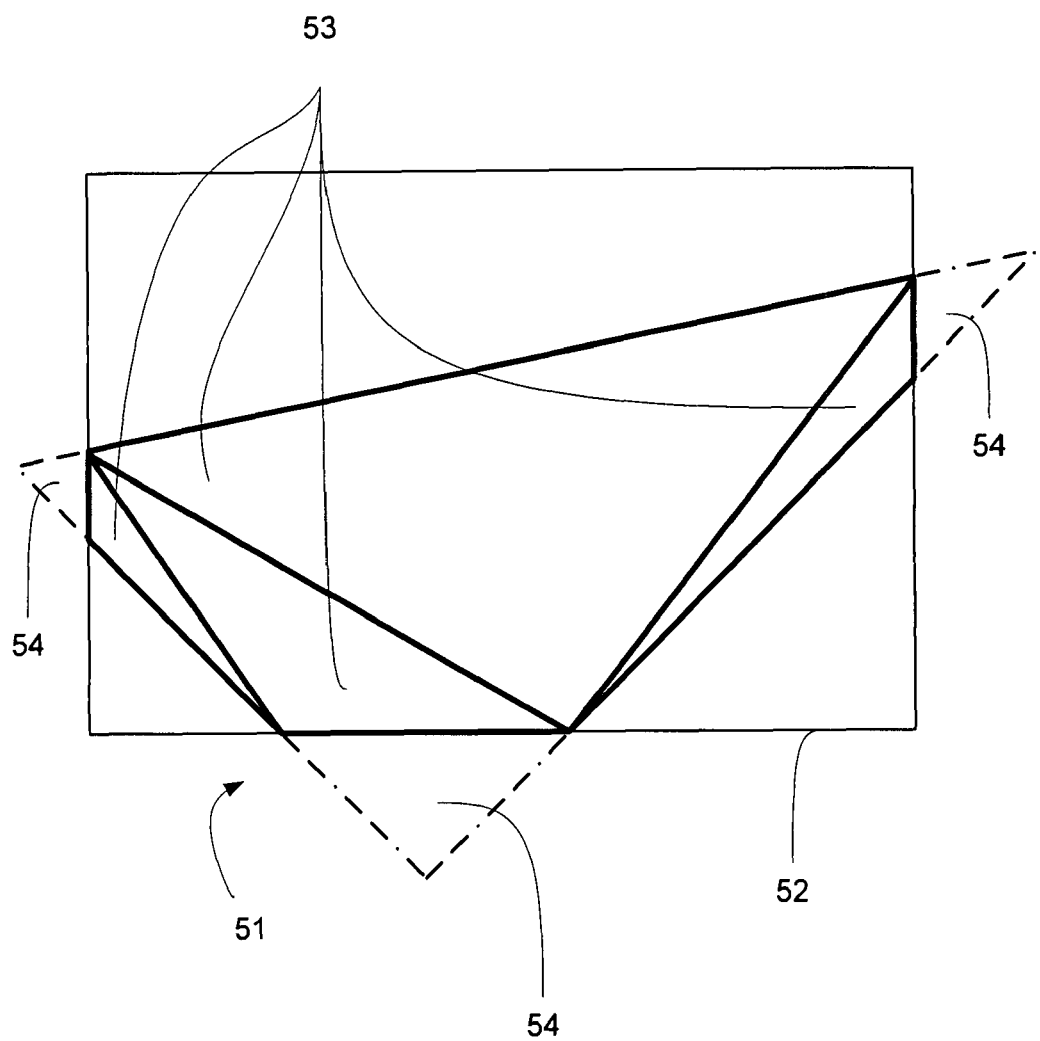
Figure 5 : PRIOR ART

SYSTEMS FOR AND METHODS OF CONTEXT SWITCHING IN A GRAPHICS PROCESSING SYSTEM

BACKGROUND OF INVENTION

1. Field of Invention

Embodiments of the invention generally relate to graphics processing systems, and in particular, to context switching in a graphics processing system.

2. Discussion of Related Art

Today, most computer systems include graphics processing systems that process 2D graphics data, 3D graphics data and video data. Examples of tasks that may be assigned to a graphics processing system include displaying a spread sheet, displaying a video stream, or rendering a 3D video game scene. Graphics processing systems may include a circuit board or integrated circuit (e.g., a chip) sometimes referred to as a graphics engine. Further, the graphics engine may include a graphics processing unit (e.g., graphics processor). Often, the graphics processor includes a plurality of processing modules arranged in a pipeline where the modules receive data from the preceding module in the pipeline.

In a multi-tasking computer system, applications convert video streams, 2D objects and 3D objects into command lists that may be executed by the graphics processing system. Standard graphics systems receive and process one or more command lists to produce an image or frame which may be displayed on a monitor or stored in a memory. A command list can include geometric data, instructions and state information. Often, command lists are forwarded by an application to a host computer to be executed by the graphics processing system. Commands such as "write to memory," "read from memory," etc. are some examples of instructions which can be included in a command list.

Generally, geometric data includes primitives, such as points, lines, triangles, polygons or surfaces that provide the "building blocks" that are used to complete an object or objects when they are presented together in an image. A primitive may be described by a set of vertices with their corresponding attributes such as position, color, depth, texture coordinates, etc. Further, a primitive is associated with one or more pixels in a display where an image including the primitive is to be displayed. FIG. 5 illustrates an example in which a primitive 51 is a first triangle to be presented in an area 52 of a display. FIG. 5 includes regions 54 (outlined in phantom) of the primitive 51 that lie outside of the area 52. Accordingly, some graphics processing systems may represent the primitive 51 as a set of sub-primitives which are elements that can be combined to represent the primitive, for example, the portion of the primitive that is located within the area 52. Generally, the sub-primitive is a result of a partitioning of a larger primitive into a plurality of regions. For example, as illustrated in FIG. 5, sub-primitives 53 (i.e., four triangles, respectively) represent different regions of the primitive 51 that lie within the area 52. The set of these sub-primitives is combined to represent the primitive 51. Further, each of the primitive and the sub-primitives include one or more pixels in the area 52.

Generally, state information provides the graphics processing unit with information regarding how to process a primitive. For example, each level of the graphics pipeline (e.g., each module of a graphics pipeline) includes static and dynamic states. Static states configure the graphics engine to process a given primitive. In general, dynamic states are a result of internal computations. Accordingly, dynamic states often change during the processing of a primitive. The primitive's shape, lighting, shading information, and textures are examples of states.

FIG. 1, illustrates a system 10 including a host system 11 that includes a host processor 12 and a system memory 13, a graphics processing system 14 that includes a graphics processor 15 and a local memory 16, and an output 17. In the illustrated embodiment, the host processor 12 is connected to the system memory 13, and the graphics processor 14 is connected to the local memory 16. Further, in the illustrated embodiment, the host system 11 is connected to the graphics processing system 14 and the graphics processing system 14 is connected to the output 17. As will be recognized by those of skill in the art, another embodiment of a graphics processing system 14 may include a graphics processor 15 without including a local memory [ml]. Further, system 10 may include a plurality of I/O connections (e.g., the I/O connections may be used to connect the system 10 to a keyboard, a mouse, etc.) and additional processing components that are not illustrated in FIG. 1.

In general, the host processor 12 generates a list of commands to be executed by the graphics processor 15 which are stored in the system memory 13 or in the local memory 16. The graphics processor 15 can retrieve data from system memory 13 or from local memory 16 and execute the list of commands retrieved from the memory. Further, the output of the graphics processor 15 may be stored in the local memory 16 or the system memory 13 or it may be communicated to the output 17. The output 17 may be connected to a display screen, a storage device (e.g., a hard drive) or a communication link (e.g., an Ethernet cable).

Each command list is associated with a general state of the graphics processing system. The general state is referred to as a context. For example, a first context may be associated with the execution of a first command list or first set of command lists. In this example, a second context may be associated with the execution of a second command list or a second set of command lists.

Current computing systems frequently seek immediate access to the graphics processing system for the processing of a second context while the graphics processing system is processing a first context. That is, an operating system may prioritize the processing such that the processing of the second context should interrupt the processing of the first context. For example, the host processor of a computer system may receive a request from an application for immediate access to the graphics processing system while the system is processing a context associated with a different application. As one specific example, the computer system may have both a 3D game application and a video streaming application running simultaneously. The video application may need to refresh a frame on the screen while a 3D game scene is being rendered. Where a system is unable to efficiently switch context, the refreshing of the video frame may be considerably delayed (e.g., refreshing may not be completed on time) because the processing of the 3D scene may take a relatively long time.

The graphics processing system may receive command lists from the host processor in a variety of ways. In one existing approach, the graphics processing system receives a first command list. A subsequent command list is not communicated to the graphics processing system until the graphics processing system completes the processing of the first command list. Thus, in this approach, the graphics processing system cannot switch from a first context to a second context because the graphics processing system must complete the execution of the first command list before switching to the subsequent command list (e.g., a command list that is associated with a second context). This approach also requires that the host processor wait for the graphics engine to send an end of processing signal before providing a second list of commands. As a result, the graphics processing system may remain inactive for a considerable period before receiving a new command list to process.

In another approach, the graphics processing system receives a plurality of command lists from the system. For example, the host processor may put a plurality of lists in a command buffer from which the graphics processor may read a first command list. A variety of methods, known in the art, are used to fill out the command buffer so that once the graphics processor finishes processing a first command list; it immediately starts a second one. Here too, the processing of the command lists proceeds serially and does not provide an opportunity to switch between context.

Some prior approaches have attempted to context switch a graphics processing system before completion of a then-current context. For example, prior approaches have attempted to switch from a first context to a second context and then later return to the first context to complete it.

One approach employs a driver, executed on the host processor, to control the context switching. To interrupt the processing of a first context during processing, the driver sends a request to the graphics processing unit to stop processing the first command list. The driver also manages a saving of the graphics processor first context and communicates a second command list to the graphics processing unit. According to this approach, however, the graphics processing unit continues to process all primitives associated with the first command list which are already fetched by the input assembler before processing the second command list associated with the second context. As a result, this approach is inefficient in switching context because of the continued processing of the first command list before a context switch is made.

Another approach employs a secondary rasterizer connected to a pixel shader. In this approach, the secondary rasterizer is smaller and simpler than the main rasterizer and is limited to processing a very specific type of primitive. Here, the graphics processor stops the main rasterizer upon receipt of a request to switch from a first context to a second context and sends the second command list to the secondary rasterizer. However, this approach fails to provide for context switching of any of the more complex command lists which may also require a context switch. In addition, a single rasterizer is not used to process the first context and the second context.

SUMMARY OF THE INVENTION

According to the preceding, prior approaches fail to employ the ability of graphics processing systems to preemptively multitask when considering how to context switch. In particular, prior approaches fail to recognize that a rasterizer can switch from a first context to a second context by interrupting the processing of a primitive before that processing is complete. Further, prior approaches also fail to recognize the advantages achieved by saving states of graphics processing modules where the states are those associated with processing the primitive that is interrupted regardless of whether those states are the current states of all of the processing modules in the system. In particular, prior approaches fail to recognize that it is advantageous to save such states for processing modules that have already completed the processing at the time of the context switch.

According to various embodiments of the present invention, a graphics processing system can perform context switching before the processing of a primitive of a current context is completed. In a further embodiment, the context switching can be performed at a sub-primitive level or even finer level of granularity.

In accordance with one aspect, the invention provides a method of processing a primitive associated with a first context where the primitive includes a plurality of regions. According to one embodiment, the method employs a graphics processing system including a first module and a second module located upstream of the first module in the system and the method includes acts of: receiving, by the first module, data concerning the primitive from the second module following a processing of the primitive by the second module; receiving a request to process a command list associated with a second context; interrupting, before completion, a processing of the primitive associated with the first context by the first module upon completion of a processing by the first module of at least a first region selected from among the plurality of regions; saving a state of the second module, where the state corresponds to the state of the second module when the second module processed the primitive associated with the first context; and processing at least a part of the command list associated with the second context.

In accordance with another aspect of the invention, a graphics processing system is configured to switch from a processing of a primitive associated with a first context to a processing of a command list associated with a second context where the primitive includes a plurality of regions. According to one embodiment, the system includes a plurality of processing modules, where at least one module of the plurality of processing modules is configured to receive a request to switch to the second context. In one embodiment, the plurality of processing modules includes a first module that is configured to, following a receipt of the request by the at least one module, to complete a processing of at least one region selected from among the plurality of regions before interrupting the processing of the primitive prior to completion and processing at least a part of the command list associated with the second context; and a second module that is configured to provide data concerning the primitive to the first module following a processing of the primitive by the second module. In accordance with a further embodiment, the graphics processing system also includes a memory configured to save a state of the second module, where the state corresponds to the state of the second module when processing the primitive associated with the first context.

In a further aspect of the invention, a graphics processing system is configured to switch context. According to one embodiment, the graphics processing system includes a rasterizer configured to process a primitive associated with a first context, where the primitive comprises a plurality of regions; and a context switch unit coupled to the rasterizer and configured to save a state of the rasterizer when processing the primitive. In one embodiment, the rasterizer is further configured to, following a receipt of a request to switch to a second context, complete a processing of at least one region selected from among the plurality of regions before interrupting a processing of the primitive and beginning a processing of a command list associated with the second context.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 illustrates a graphics primitive;

DETAILED DESCRIPTION

Figure 1:
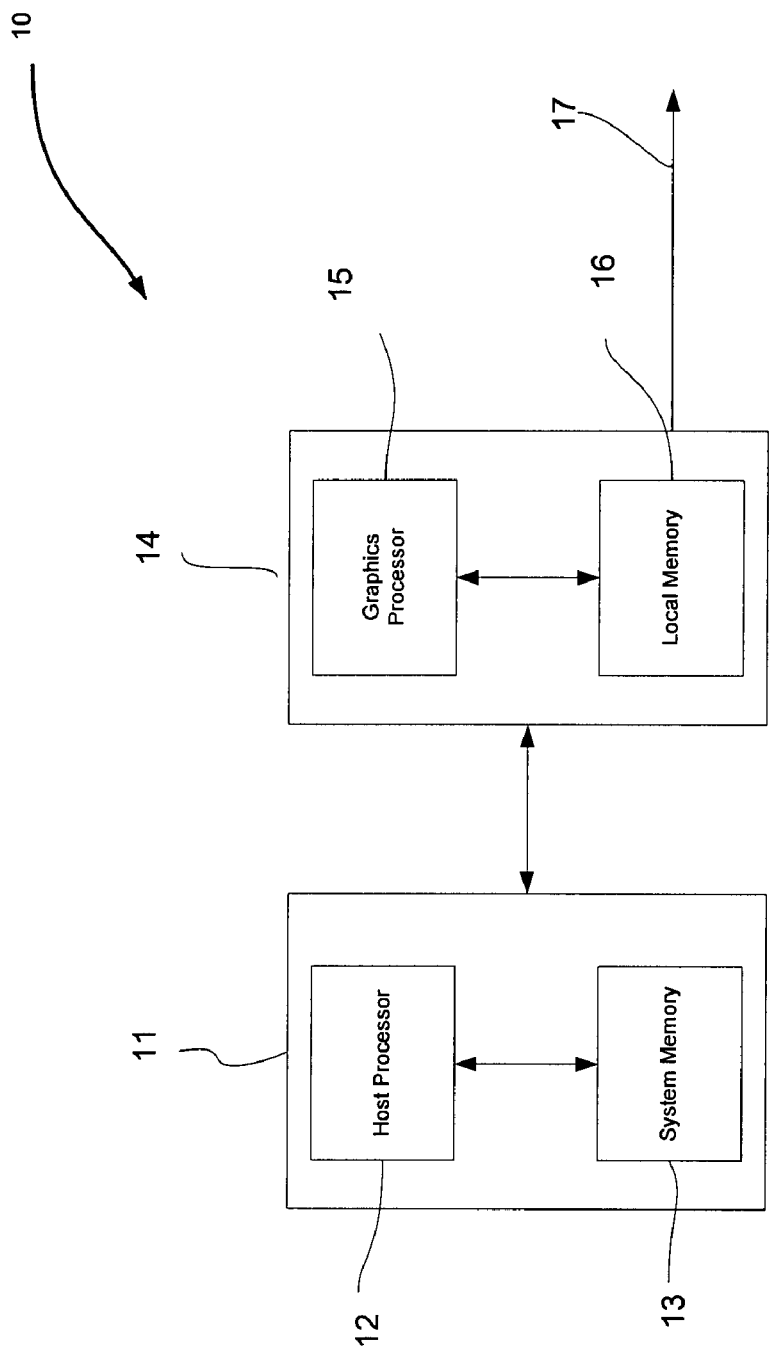
FIG. 1 illustrates a system including a graphics processor.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As used herein, the term "first context" and "second context" are employed to establish that the first context and second context are received by a graphics processing system at distinct moments. Unless specifically indicated, the term first context is not used to establish that a context is an initial context processed by the graphics processing system.

Figure 2:
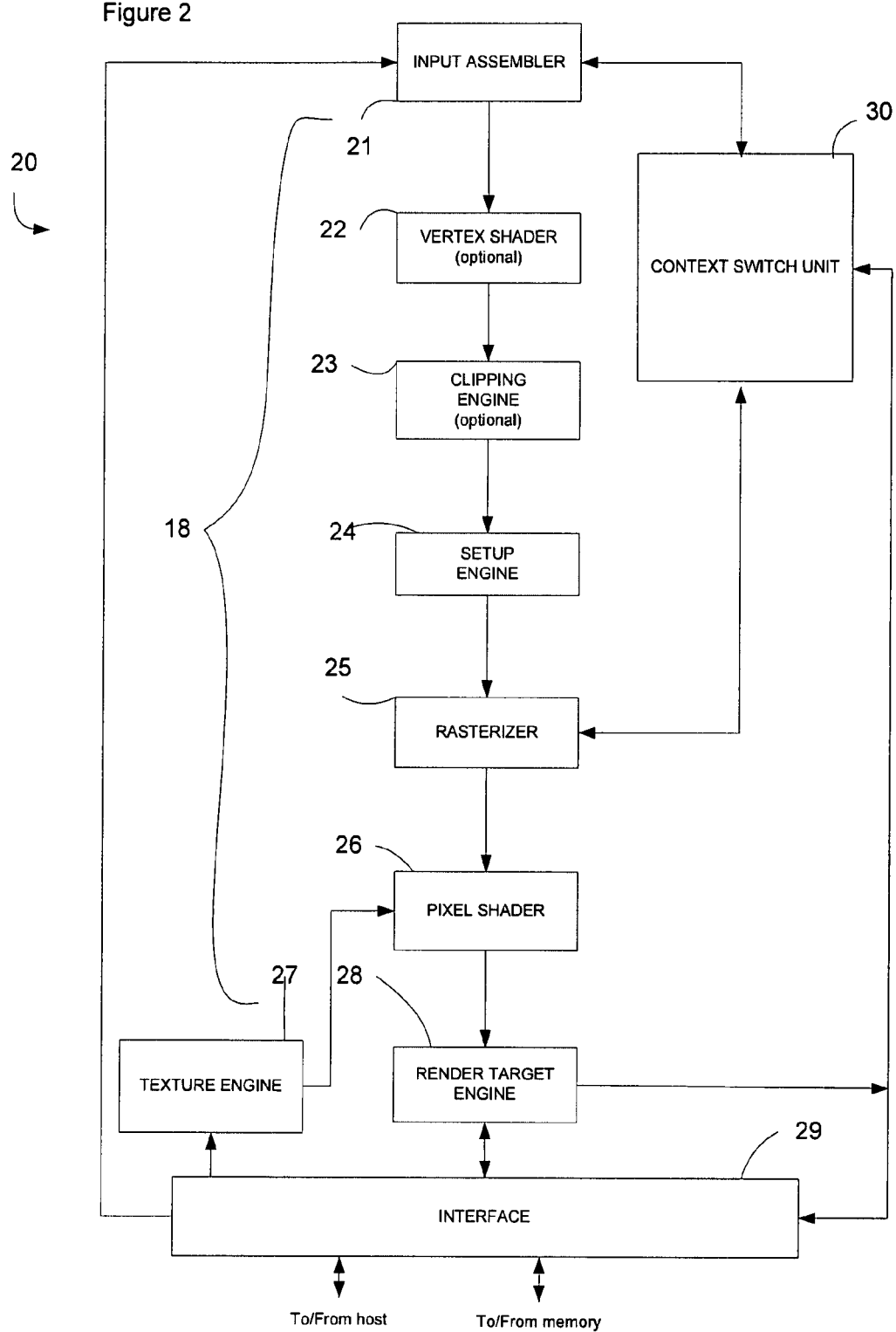
FIG. 2 illustrates a graphics processor in accordance with an embodiment of the invention.

FIG. 2 illustrates a graphics processor 20 including a plurality of processing modules 18 in accordance with one embodiment. In one embodiment, the plurality of processing modules 18 include an input assembler 21, a vertex shader 22, a clipping engine 23, a setup engine 24, a rasterizer 25, a pixel shader 26, a texture engine 27 and a render target engine 28. The graphics processor 20 also includes an interface 29.

The graphics processor 20 also includes a context switch unit 30. Although illustrated as a stand alone module, the context switch unit 30 may be included in one of the processing modules 18.

In accordance with one embodiment, the graphics processor 20 is included in a graphics processing system. In one embodiment, the graphics processor 20 is included in a graphics chip. In a further embodiment the graphics processor 20 is included in a graphics engine. In another embodiment the graphics processor 20 is included in a multi-functional chip.

In one embodiment, an output of the input assembler 21 is connected to an input of the vertex shader 22, an output of the vertex shader 22 is connected to an input of the clipping engine 23, an output of the clipping engine 23 is connected to an input of the setup engine 24, an output of the setup engine 24 is connected to an input of the rasterizer 25, an output of the rasterizer 25 is connected to an input of the pixel shader 26, an output of the texture engine 27 is connected to an input of the pixel shader 26 and an output of the pixel shader 26 is connected to an input of the render target engine 28. In this example the processing modules may include software modules (e.g., one or more algorithms) hardware modules (e.g., circuits) or a combination of hardware modules and software modules. As illustrated in FIG. 2, in some embodiments, two or more of the processing modules are configured in a graphics pipeline.

In accordance with one embodiment, the interface 29 provides an interface between the graphics processor 20 and each of a host and a memory. The interface 29 may include a first input/output ("I/O") connected to the host and a second I/O connected to the memory. In a further embodiment, a single I/O (e.g., communication channel) is connected to the host and the memory. In the illustrated embodiment, a first output of the interface 29 is connected to an input of the input assembler 21, a second output is connected to an input of the texture engine 27, an I/O is connected to the render target engine 28 and an I/O is connected to the context switch unit 30. Those of ordinary skill in the art will recognize that any of a variety of interconnections may be employed between processing modules, and between processing modules 18 and the interface 29.

In the illustrated embodiment, the context switch unit 30 is included in the graphics processor 20 as a separate module where a first I/O is connected to an I/O of the interface 29, a second I/O is connected to an I/O of the input assembler 21 and a third I/O is connected to the rasterizer 25. In other embodiments, the context switch unit 30 in included in the rasterizer. In a further embodiment, the context switch unit 30 is included in the input assembler 21.

Other interconnections between the elements of the graphics processor 20 may be employed in various embodiments. For example, in one embodiment, the texture engine 27 can be located downstream of the rasterizer 25 and upstream of the pixel shader 26. In other embodiments, two or more of the processing modules (e.g., the functionality of two modules) are combined in a single module and included in the graphics processor 20. For example, the functionalities of the vertex shader 22 and the clipping engine 23 can be included in the input assembler 21. In another embodiment, the setup engine 24 and the rasterizer 25 may be included in one module. In further embodiments, one or more of the processing modules illustrated in FIG. 2 are not employed in the graphics processor 20. For example, in various embodiments, either or both of the vertex shader 22 and the clipping engine 23 are not included in the graphics processor 20.

Elements of the graphics processor 20 including various ones of the processing modules 18 may be embodied in hardware, software or a combination of hardware and software. For example, in some embodiments, the system may include a hardware implementation of the vertex shader 22 and of the clipping engine 23. In other embodiments the vertex shader 22 and clipping engine 23 can be software modules. Further, where a plurality of the processing modules are implemented in hardware, a single electrical circuit may include two or more of the plurality of the processing modules 18.

In general, the various graphics processing modules are configured to operate in the following manner in accordance with one embodiment. The host processor may send a request to the graphics processor 20 to immediately execute an initial command list. Where the graphics processor is idle, the graphics processor 20 may begin processing the command list without any delay. The input assembler 21 receives a command list through the interface 29. The input assembler 21 may retrieve data from memory including static states, instructions and/or primitives. The input assembler 21 can dispatch the data to other elements of the graphics processor 20. In one embodiment, the input assembler 21 may receive an address at which it may fetch a list of commands. In other embodiments, the input assembler 21 may receive the command list directly from the host processor. In further embodiments, the input assembler 21 may receive from the host computer a plurality of command lists. In general, the input assembler 21 can read data from system or local memory and forward the data to the processing modules of the graphics processor 20 while the input assembler is processing a command list. In accordance with one embodiment, the input assembler 21 configures the processing modules of the graphics processor 20 with the appropriate static states and sends a primitive's vertices to the next processing module. Further, the input assembler 21 may forward instructions to the processing modules for execution.

In accordance with one embodiment, the vertex shader 22 converts the primitive's coordinates from model space to homogenous space. For example, the vertex shader 22 can transform vertices included in a primitive into homogeneous space, for example, to account for rotation, scaling, etc. The clipping engine 23 can determine the portions of the primitive that lie within a predefined region. In one example, the setup engine 24 can perform preliminary calculations and determine parameters that will be used by the rasterizer module or the other processing modules that are located downstream the setup engine 24 in the graphics processor 20, e.g., the rasterizer 25, pixel shader 26, etc. As a more specific example, the setup engine 24 may compute gradients and slopes of the primitive's edges.

The rasterizer 25 can determine which pixels (e.g., pixels in the screen space) belong to the primitive that is being processed. Further, the rasterizer 25 can transform the primitive's coordinates from homogeneous space to a screen space, for example, a display. According to one embodiment, the output of the rasterizer (e.g., pixels) is communicated to the pixel shader 26. The pixel shader 26 communicates with the texture engine 27 and, for each pixel, the modules determine quantities such as the color, and texture of the pixels according to the attributes of the primitive that is being processed and according to the states and instructions sent by the input assembler 21. In accordance with this embodiment, the render target engine 28 computes the depth and performs color processing. When the processing is completed by the graphics processor 20, the system outputs the pixels to the local memory, the system memory and/or a display. Those of ordinary skill in the art will recognize that additional functionality and/or different functionality than those listed here may be associated with each of the plurality of processing modules 18.

Figure 3:
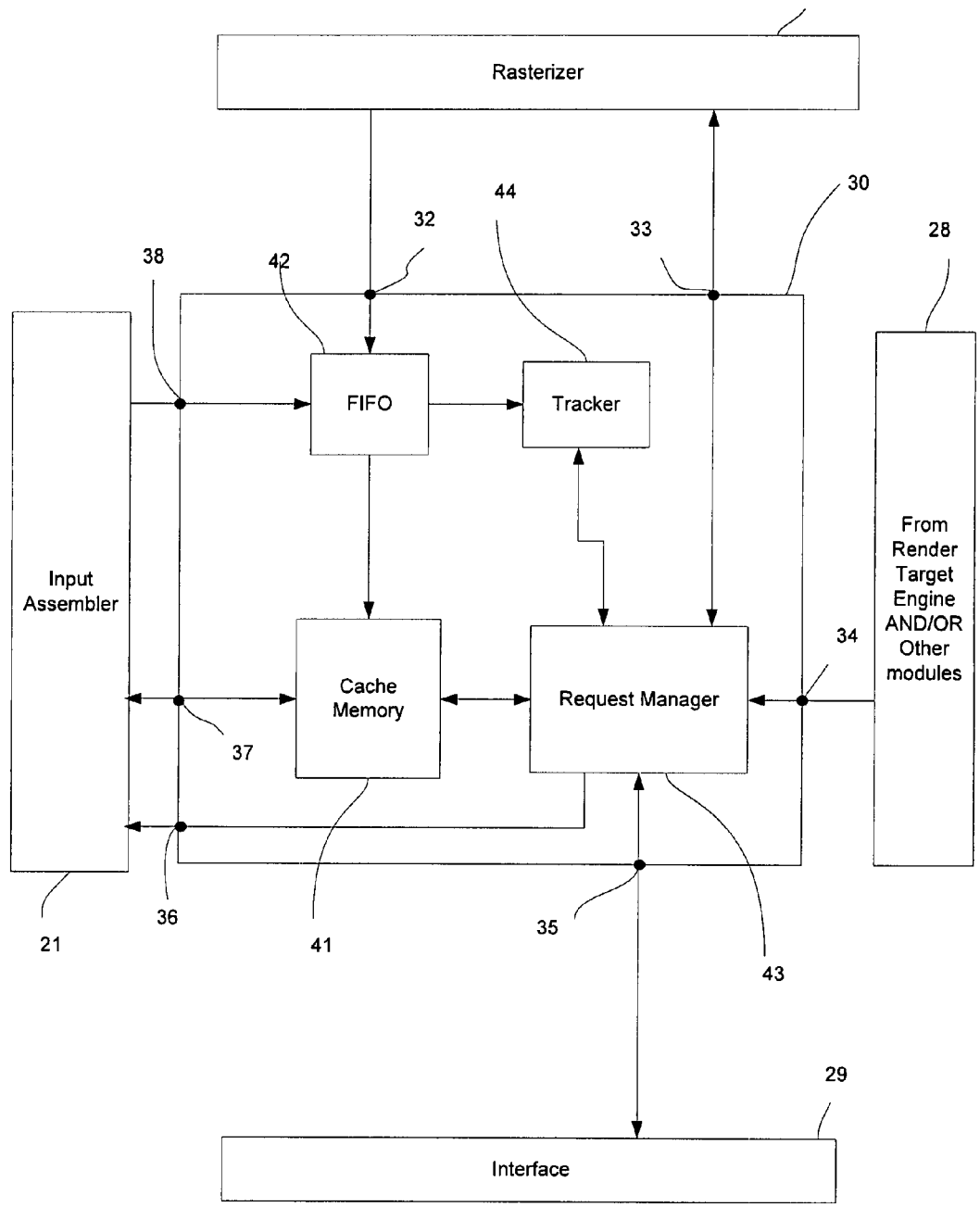
FIG. 3 illustrates a context switch unit in accordance with an embodiment of the invention.

According to one embodiment, the context switch unit 30 may include a plurality of modules including a FIFO, a tracker and a request manager. According to this embodiment, the context switch unit 30 may include a plurality of inputs, outputs and combined I/O connections used to connect the context switch unit 30 to one or more of the plurality of processing modules 18. Further the context switch unit 30 may be connected through an interface to a memory unit (e.g., a local memory or a system memory). Referring now to FIG. 3, the context switch unit 30 is illustrated in accordance with one embodiment. In the illustrated embodiment, the context switch unit 30 includes a plurality of modules including a cache memory 41, a FIFO 42, a request manager 43 and a tracker 44. In addition, the context switch unit 30 may include a plurality of inputs, outputs and combined I/O connections. For example, in the illustrated embodiment, the context switch unit 30 includes an input 32 and an I/O 33 each connected to the rasterizer 25. In a further embodiment, the input 32 and the I/O 33 are included in a single I/O. The context switch unit 30 may also include an input 34 connected to the render target engine 28. In a further embodiment, the input 34 or a plurality of additional inputs connect the context switch unit 30 to one or more additional processing modules 18 included in the graphics processor 20. In addition, the context switch unit 30 may include an I/O 35 that connects the context switch unit 30 to the interface 29, an output 36 connected to the input assembler 21, an I/O 37 connected to the input assembler 21 and an input 38 connected to the input assembler 21. In the illustrated embodiment, the input 32 and the input 38 are connected to the FIFO 42, the I/O 33, the input 34, the I/O 35 and the output 36 are connected to the request manager 43, and the I/O 37 is connected to the cache memory 41. As should be recognized by those of ordinary skill in the art, other interconnections may be employed in various embodiments.

Further, the modules included in the context switch unit 30 may communicate with one another to communicate data and instructions, for example, via one or more communication channels. As illustrated, the FIFO 42 is connected to the tracker 44 and the cache memory 41. The cache memory 41 is also connected to the request manager 43. As further illustrated, the request manager 43 is also connected to the tracker 44.

In general, the modules included in the context switch unit 30 operate in the following manner in accordance with one embodiment. The FIFO 42 receives data from the input assembler 21 as it is communicated to the processing modules (e.g., as it is communicated to the vertex shader 22). In accordance with a further embodiment, the FIFO 42 has a capacity such that it can maintain all of the data communicated from the input assembler 21 to the processing modules that are located upstream of the rasterizer 25 in a graphics pipeline. In other words, the FIFO 42 compensates for the depth of the graphics pipeline upstream of the location where the context switching is performed in the graphics pipeline. In one embodiment, the cache memory 41 stores a copy of static states of the graphics processor 20 and the tracker 44 stores the dynamic states of the input assembler. In some embodiments, a copy of static states of the graphics processor 20 and the dynamic states of the input assembler are saved in an external memory unit (e.g., a system memory or a local memory included in the graphics processing system). Further, in some embodiments, the states are first saved in the context switch unit 30 (e.g., in the cache memory or the tracker) from which they may later be copied to an external memory unit, for example, at the time of a context switch.

In accordance with one embodiment, a static state is a configuration state and a dynamic state is an execution state. That is, a static state may provide information concerning the configuration of the graphics processor to process a primitive in a selected context. For example, a static state may provide information concerning the configuration of the graphics processor when processing a primitive having a particular shape. In various embodiments, static states remain constant during the processing of a primitive. In a further embodiment, a dynamic state may result from an internal computation and may change during the rendering of a single primitive. That is, the dynamic state may be specific to a primitive, a sub-primitive or some other region of a primitive.

In various embodiments, including those in which the context switch unit is included in the input assembler, the FIFO and the cache memory are included in the input assembler.

In accordance with one embodiment, the FIFO 42 provides a queue for storing a series of primitives and their corresponding states. The primitives may be copies of the primitives processed at different levels of the graphics processing system 20. In one embodiment, the FIFO includes the primitives and states stored in an order in which they are processed in the graphics processing system. For example, the FIFO 42 includes the primitive being processed in the rasterizer 25, followed by the states and the primitive processed in the setup engine 24, followed by the states and the primitive processed in the clipping engine 23 and the states and the primitives processed in the vertex shader 22. Further, the FIFO 42 receives states and the primitive currently being processed by the input assembler, including the dynamic states of the input assembler. In other embodiments, the context switch unit, and in particular, the FIFO 42, may receive primitives and states from a different location in the graphics processor 20. For example, the input 38 may be connected at an output of the vertex shader 22, the clipping engine 23 or the setup engine 24.

According to one embodiment, the contents of each of the cache memory 41 and the tracker 44 are updated with data received from the FIFO 42 each time the rasterizer 25 accepts a primitive for processing. For example, the rasterizer 25 may send a signal to the context switch unit 30 upon receiving a primitive. In response, the context switch unit 30 may transfer the states corresponding to the primitive received by the rasterizer from the FIFO 42 to the cache memory 41 and the tracker 44. Where the FIFO is organized such that states precede their corresponding primitive, the cache memory 41 is updated with the states corresponding to the primitive being processed in the rasterizer. Further, the tracker 44 can be synchronized with the rasterizer 25 to identify the next element of the command list that will be processed by the rasterizer 25. In accordance with one embodiment, the cache memory 41 is included in the rasterizer 25 and the rasterizer can put the states concerning the primitive that is currently being processed by the rasterizer 25 in the cache memory 41. In another embodiment, the content of each of the cache memory 41 and the tracker 44 are updated with states corresponding to the next primitive while the rasterizer is completing the processing of a primitive. (Where the next primitive is the primitive that will be processed by the rasterizer following the completion of the processing by the rasterizer of its then current primitive.) For example, the rasterizer may send a signal to the context switch unit 30 indicating that it is completing the processing of its current primitive. In response to this signal, the context switch unit may transfer the states corresponding to the next primitive that will be processed by the rasterizer, from FIFO 42 to the cache memory 41 and the tracker 44.

Thus, in accordance with one embodiment, the cache memory may include the current state of the rasterizer 25, a current or a future state of the modules downstream of the rasterizer and a current or past state of the modules upstream of the rasterizer in the graphics processor 20. That is, the cache memory will include the states of each of the modules upstream of the rasterizer 25 at the time these modules processed the particular primitive currently being processed by the rasterizer. Further, the cache memory will include the states of each of the modules downstream of the rasterizer 25 at the time these modules process the particular primitive currently being processed by the rasterizer. At the time the rasterizer accepts the primitive for processing, however, the upstream modules may have already moved on to the processing of a subsequent primitive for which they are configured in a different state. Accordingly, the saved state or states of the processing modules upstream of the rasterizer may not reflect the current state of those modules. According to another embodiment, the cache memory may include a state of the rasterizer 25, a current or a future state of the modules downstream of the rasterizer and a current or past state of the modules upstream of the rasterizer corresponding to the next primitive that will be processed by the rasterizer. At the time where the rasterizer is completing the processing of its current primitive, the states transferred to the cache memory may then not be identical to the current states of the rasterizer and its preceding or subsequent modules.

In accordance with one embodiment, data is transferred from the FIFO, included in the context switch unit, to a local memory or a system memory through interface 29 each time the rasterizer 25 accepts a primitive for processing. In accordance with this embodiment, the memory (e.g., local or system memory) is used to save the states of graphics processor corresponding to the primitive being processed in the rasterizer. In another embodiment, data corresponding to the next primitive is transferred from FIFO to the local memory or the system memory while the rasterizer 25 is completing the processing of its current primitive. In this embodiment, the next primitive is the one that is processed by the rasterizer upon completion of the processing of its current primitive.

In a further embodiment, the rasterizer includes multiple processing levels where a specific one of the processing levels is selected as a context switch level. In one embodiment, the context switch level is not the final processing level included in the rasterizer. In one embodiment, the contents of each of the cache memory 41 and the tracker 44 are updated with data received from the FIFO 42 each time the rasterizer 25 starts processing a primitive. In another embodiment, the contents of each of the cache memory 41 and the tracker 44 are updated with data received from the FIFO 42 and corresponding to the next primitive, (e.g., which will be processed by the rasterizer upon completion of the processing of its current primitive) each time the rasterizer 25 is completing the processing of its current primitive at the selected context switch level. In a version of this embodiment, the rasterizer 25 may send an "end-of-primitive" signal to the context switch unit upon completion of a processing of a primitive. In accordance with one embodiment, the contents of the cache memory 41 and the tracker 44 are updated with data received from FIFO 42 and corresponding to the next primitive each time the rasterizer starts processing the last portion (e.g., region) of the primitive at the context switch level.

In accordance with one embodiment, the request manager 43 receives context switch requests and communicates them to the rasterizer. Further, when the rasterizer accepts the context switch, the rasterizer communicates to the request manager 43 that it has accepted the context switch and the request manager 43 may then initiate the context switch. In one embodiment, for example, where the context switch unit 30 is included in the input assembler 21, the context switch unit 30 may send a request to switch context through a direct communication channel between the input assembler 21 and the rasterizer 25.

In accordance with various embodiments, the graphics processor 20 does not switch context where the first context and the second context are the same context. Accordingly, in one embodiment, the graphics processor 20 may switch from its current context to a second context in response to a request to switch context without checking to determine whether the contexts are the same. In another embodiment, the graphics processor 20 determines whether the context that it has been requested to restore differs from the current context being processed. In a version of this embodiment, following a request to switch context from a first context to a second context, the graphics processor 20 does not switch context where it determines the first context and the second context are the same.

Figure 6A:
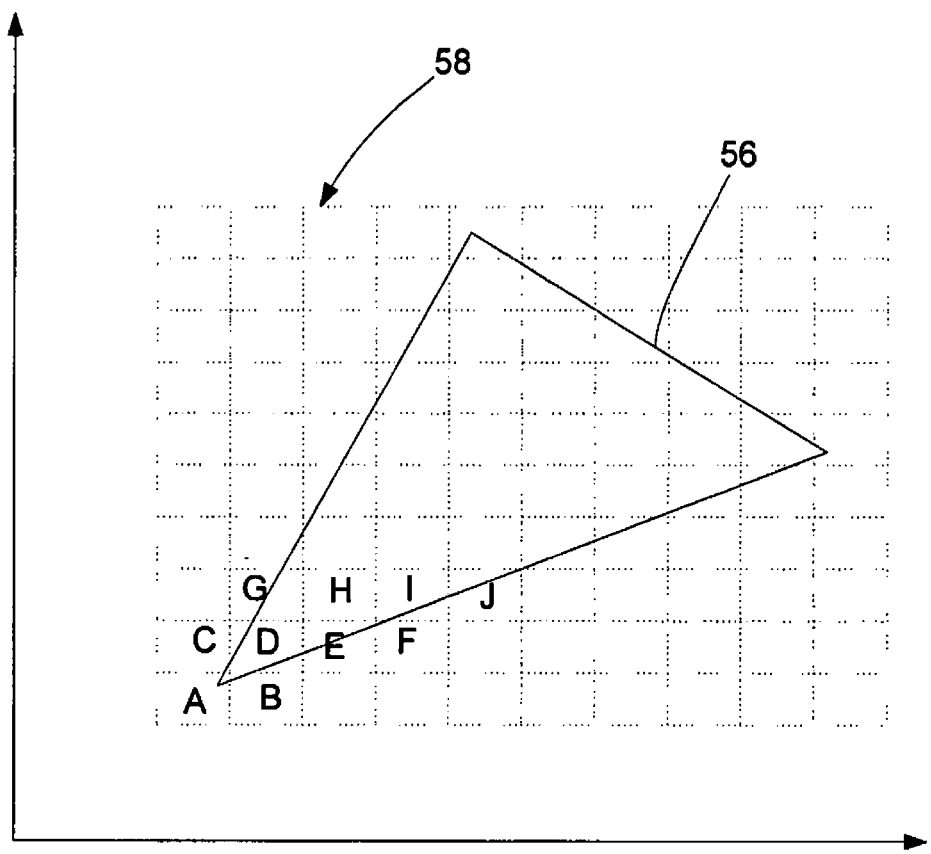
FIGS. 6A-6B illustrate a processing of a primitive in accordance with another embodiment of the invention.
Figure 6B:
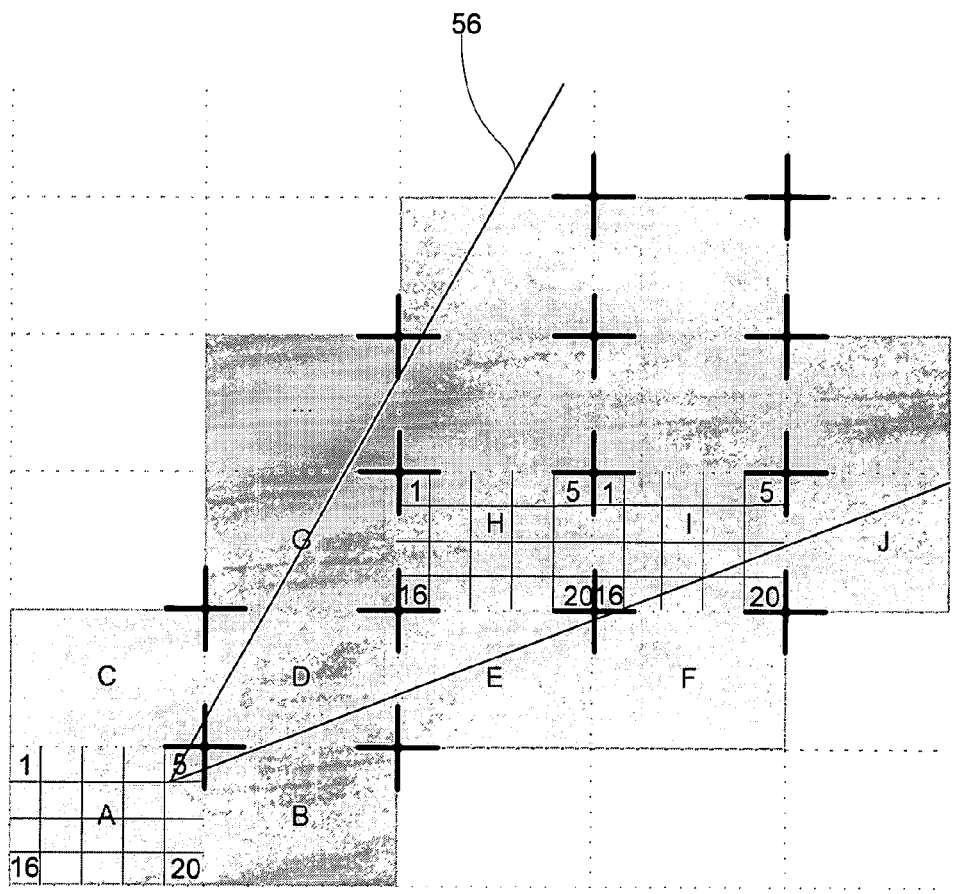

As mentioned above, a primitive may include, or be defined by, a plurality of regions or sub-elements. For example, the primitive illustrated in FIG. 5 includes the sub-primitives 53 that together represent the portion of the primitive 51 that is included in the display area 52. FIGS. 6A-6B provide further details concerning a method by which the processing of a first context may be interrupted for a context switch at a sub-primitive or greater level of detail (for example, at a pixel level) in accordance with various embodiments. Thus, the primitive 51 and the sub-primitives 53 may be further defined by one or more regions including at least one pixel.

FIGS. 6A-6B illustrate an example of a primitive 56 for processing by the graphics processor 20. In various embodiments, the primitive 56 may be represented either in a homogeneous space or a screen space and the process explained below may be employed for primitives represented in either type of space. Where, for example, the primitive is represented in a homogenous space, the rasterizer may transform the primitive's coordinates from the homogenous space to screen space. Further details concerning the process are explained with reference to a primitive represented in screen space.

As illustrated in FIG. 6A, the screen space is partitioned into a plurality of areas 58 as one step in determining which regions of the primitive are included in the screen space. In accordance with one embodiment, the rasterizer 25 partitions the screen space into the plurality of areas 58, for example, the portions A-J illustrated in FIG. 6A. In some embodiments, these portions of the screen may be referred to as blocks where each block includes at least one pixel. The term block is intended to describe a contiguous or a non-contiguous area of one or more pixel. The term block is not intended to describe a particular shape of an area. As will be recognized by those of skill in the art, a block may be any shape formed by a contiguous or a non-contiguous group of one or more pixels. Further, a screen space can be partitioned into a plurality of areas with a variety of different shapes relative to one another.

Referring to FIG. 6B, a more detailed view of blocks A-J is illustrated. In one embodiment, each block is a contiguous area of the same size and each block includes a plurality of pixels. For example, each block (e.g., the blocks A-J) can be associated with a plurality of pixels located in a 5×4 group of pixels. According to this embodiment, each block includes the pixels 1-20 as illustrated in block A. Further, one or more of the blocks A-J may have a size that differs from others of the blocks A-J. Also, blocks having a different size of M×N pixels may be employed in a similar manner as described here.

According to one embodiment, a primitive may be processed at a region level, that is, region by region where each region of the primitive is included in a block. Further, in some embodiments, a primitive may be defined as a plurality of sub-primitives and the sub-primitives may be processed at a region level. In one embodiment, the preceding approach allows one or more of the processing modules to process a primitive at a region level with a hierarchy that is generally represented as: primitive; sub-primitive; region. In various embodiments, this detailed level of processing granularity provides a graphics processor with the capability of interrupting the processing of a first context (e.g., the processing of a command list associated with the first context) at a region level, saving the first context at the region level and restoring the first context at the region level.

In one embodiment, the rasterizer 25 is configured to process a bounded portion of a primitive, for example, a sub-primitive or a region included in a block. In a version of this embodiment, the bounded portion of the primitive may be determined by the rasterizer 25. In another version, the bounded portion of the primitive is provided by the clipping engine 23. Further, the rasterizer 25 may be configured with one or more predefined locations on a screen space at which it can stop processing a primitive.

In accordance with one embodiment, while processing a primitive from a command list, the rasterizer partitions the screen space according to a predefined grid and each element of the grid is processed. For example, the rasterizer determines which pixels of block A belong to the primitive. In the example, only the right uppermost pixel (i.e., pixel 5) of the block A belongs to the primitive 56. It should be recognized, that in this example, the blocks D, E and G include a plurality of pixels which belong to the primitive 56. Further, in this example, all of the pixels 1-20 of block H belong to the primitive 56. According to the illustrated embodiment, the rasterizer processes each region included in a 5×4 block of pixels. In another embodiment, each portion of the screen (e.g., the portions A-J) is a block of 16×32 pixels.

As will be recognized by those of ordinary skill in the art, some primitives may only include the border defined by the primitive. Referring to FIG. 6B, where the primitive 56 includes only the outline (and not the regions within the outline) the blocks A-G, I and J include pixels that belong to the primitive. Conversely, in this example, the block H does not include any pixels that belong to the primitive.

In one embodiment, the rasterizer keeps a request to switch context pending while processing a block including a region of a primitive until the rasterizer reaches the block's (e.g., region's) boundary. For example, where the rasterizer has processed the blocks A-C and is currently processing the block D at the time of receiving a request to switch context, the rasterizer will continue processing block D until it reaches the boundary of block E. Upon reaching the boundary (i.e., completing the processing of the region included in block D) the rasterizer will begin the switch to the newly requested context.

In another embodiment, the clipping engine 23 can partition the primitive into a plurality of regions for further processing. Further, the clipping engine 23 may divide a clipped primitive into a set of bounded sub-primitives, where each sub-primitive does not exceed a predetermined size. In one embodiment, the rasterizer may be configured to process a sub-primitive and accept the context switch only when the rasterizer has completed processing a sub-primitive.

The size of the regions which are used to process a primitive may be selected, at least in part, by the desired granularity at which a context switch can be performed. In one embodiment, the regions by which the primitive is processed are included in 16×32 blocks.

Figure 4:
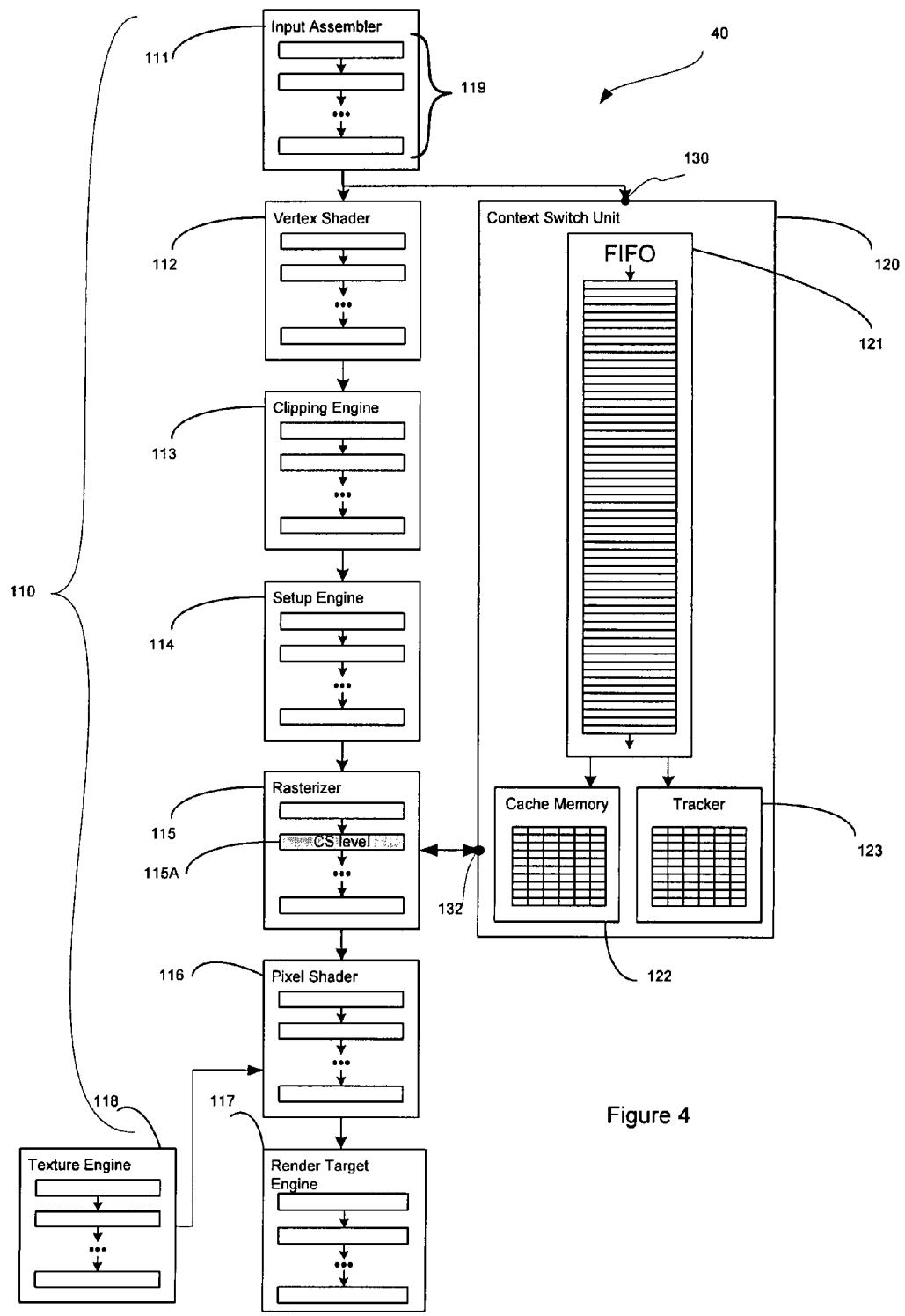
FIG. 4 illustrates a context switch unit in accordance with a further embodiment of the invention.

A further description of the processing of command lists by a graphics processing system follows here with reference to the graphics processor 40 illustrated in FIG. 4. In accordance with one embodiment, a graphics processor 40 (e.g., a graphics processing unit) includes a plurality of processing modules 110. In a version of this embodiment, the processing modules 110 are configured in a graphics pipeline. In one embodiment, a context switch unit is connected in parallel with the graphics pipeline.

In the illustrated embodiment, the graphics processor 40 includes an input assembler 111, a vertex shader 112, a clipping engine 113, a setup engine 114, a rasterizer 115, a pixel shader 116, a render target engine 117 and a texture engine 118. Further, each of the processing modules may include a plurality of levels, for example, the plurality of levels 119 associated with the input assembler 111. The levels represent various levels of the processing operation that are performed by the respective processing modules. In accordance with some embodiments, one of the levels is selected as a context switch level of the graphics processing system. That is, a level at which the processing of a command list can be interrupted by the graphics processor 20 when switching from a first context to a second context. In one embodiment, a context switch level 115A can be selected from among any of the plurality of levels 119 included in the rasterizer 115. In another embodiment, the context switch level is located in a different one of the processing modules included in the graphics processing system.

In addition, in various embodiments, the graphics processor 40 includes a context switch unit 120. In accordance with one embodiment, the context switch unit 120 includes a FIFO 121, cache memory 122 and a tracker 123. In a further embodiment, the context switch unit includes an input 130 in communication with (e.g., connected to) the graphics pipeline at a first location and an I/O 132 in communication with (e.g., connected to) a selected one of the processing modules. In some embodiments, the context switch unit 120 includes a FIFO 121, a request manager, a tracker and is connected, through an interface, to an external memory unit. The external memory may be a local memory included in the graphics processing system or system memory.

In one embodiment, the I/O 132 is in communication with a context-switch level 115A of the selected processing module. In other embodiments, the context switch unit 120 is connected to a plurality of levels of the selected processing module including the context-switch level. In some embodiments, the context switch unit 120 is in communication (e.g., connected to) with a plurality of the processing modules included in the graphics processing system.

According to one embodiment, those primitives that are fully processed at the context switch level 115A, at the occurrence of a context switch from a first context, are not re-processed when the first context is restored. In a version of this embodiment, all the primitives that are not fully processed at the context switch level 115A at the occurrence of the context switch are at least partially processed following a later restoration of the first context.

In accordance with one embodiment, a command list to be processed by the graphics processor 40 includes three primitives (e.g., the primitives: prim0, prim1, prim2), where each primitive includes two sub-primitives (e.g., the sub-primitives: subprim0, subprim1) and each sub-primitive includes three regions (e.g., each region included in a block: block0; block1, block2). The preceding quantities are employed here for clarity, as one example, although those of ordinary skill in the art will recognize that the quantity of regions in each primitive may vary and that the quantity of regions in each sub-primitive may also vary.

In accordance with this embodiment, the following sequence of primitives and regions thereof is processed at the context switch level 115A during which time a request to switch context is received:

prim0, subprim0, block0→complete
prim0, subprim0, block1→complete
prim0, subprim0, block2→complete
prim0, subprim1, block0→complete
prim0, subprim1, block1→complete
prim0, subprim1, block2→complete
prim1, subprim0, block0→complete
prim1, subprim0, block1→complete
prim1, subprim0, block2→complete
prim1, subprim1, block0→complete
prim1, subprim1, block1→context switch request is received by the rasterizer.

In the above example, the processing of prim1, subprim1, block1 is underway at the context switch level 115A prior to the receipt by the rasterizer 115 of the request to switch context. Further processing of prim1, subprim1, block1 is completed at the context switch level prior to the occurrence of the context switch. The primitive prim1, however, also includes subprim1, block 2. In this example, prim1, subprim1, block1 is the last region processed by the context switch level 115A in the graphics processor 40 prior to the context switch. Thus, prim1, subprim1, block1 is also the last region of the primitive to be processed by those processing levels located downstream of the context switch level 115A in the rasterizer 115. In addition, the processing modules downstream of the context switch level 115A (e.g., the pixel shader 116, the render target engine 117 and the texture engine 118) also process the region corresponding to prim1, subprim1, block1. All subsequent primitives (and/or regions thereof) in the command list are not processed by all the processing modules 110 before the context switch is made. That is, prim1, subprim1, block 2, and all portions of prim 2 (e.g., subprim0, block0 through subprim1, block2) are flushed. At the time of the context switch, these subsequent primitives may be located in a preceding processing module or a preceding level of the rasterizer 115 (e.g., they are located upstream of the context switch level 115A in the graphics processing system).

Conversely, the processing of each of the regions of prim0 and prim1 that were fully processed at the context switch level 115A at the occurrence of the context switch are fully processed by those levels and modules that are located downstream of the context switch level 115A. That is, in one embodiment, the primitives and all regions thereof processed by the context switch level 115A at the occurrence of a context switch are processed by all of the levels included in the rasterizer 115 and all of the processing modules located downstream of the rasterizer, e.g., the pixel shader 116, the render target engine 117 and the texture engine 118.

Further, in one embodiment, the rasterizer informs the context switch unit 120 that it's accepting the context switch. The context switch unit 120 can save information indicating that the following processing should occur when the first command list is restored: 1) the input assembler should resume at prim1 because that primitive is not fully processed by the graphics processor 40; 2) the rasterizer 115 should resume at subprim1 of prim1 because the processing of that sub-primitive is incomplete in the rasterizer; 3) and that the rasterizer should resume at block2 of subprim1 because the preceding regions of subprim1 were already processed but block2 of subprim1 is not yet processed.

According to one embodiment, the rasterizer can be configured to immediately switch from a first context to a second context either if it is in a set-up mode or if it has finished processing a primitive's region. The rasterizer is in set up mode when it receives and initializes its static states.

In various embodiments, the above approach provides a process that allows context switching at a primitive's region level with an efficient restoration that avoids reprocessing regions of a primitive at the context switch level (e.g., the level 115A) and elsewhere downstream of the context switch level. In some embodiments, the speed at which context save and context restore processes occur is improved over prior approaches because the states of all of the processing modules (e.g., a state of the complete graphics pipeline) are monitored at a single level of the graphics processing system. That is, the context switch unit can provide the information to the input assembler 111 to restore the graphics processor 40 for the first context including information concerning the state of all of the processing modules associated with the primitive at which the context switch occurs. In the preceding example, this information includes information that the input assembler 111, the setup engine 114, the clipping engine 113 and the vertex shader 112 have already processed, at least, prim0 and that the rasterizer 115, the pixel shader 116, the render target engine 117 and the texture engine 118 have each processed all of prim0 and the portion of prim1 through subprim1, block 1.

In accordance with one embodiment, a restoration of the first context may occur as follows. Employing the state information from the above example, the input assembler 111 will resume processing at prim1, the vertex shader 112 will resume processing at prim1, the clipping engine will resume processing at prim1 and, in one embodiment, will split prim1 into subprim0 and subprim1, the setup engine 114 will process prim1 and setup subprim0 and subprim1 and the rasterizer 115 will partially process prim1 (i.e., it will discard subprim0 because all of the regions associated with subprim0 were fully processed at the time of the context switch). In accordance with a further embodiment, the rasterizer 115 will also partially process prim1 subprim1 by skipping the full processing of subprim1, block0 and subprim1, block1 and then fully processing subprim1, block2. In another embodiment, the graphics processor can partially reprocess a selected sub-set of blocks including regions of the primitive in order to guarantee that the primitive is being processed with the same precision as if its processing has not been interrupted. As one example, some processing levels of the rasterizer 115 may partially process subprim1, block0 and may discard subprim1, block1, before fully processing subprim1, block2. Further, the pixel shader 116, the render target engine 117 and the texture engine 118 will process all the data that they receive. Consequently, in this example, the pixel shader 116, the render target engine 117 and the texture engine 118 will partially process subprim1, block0 and may discard subprim1, block 1, before fully processing prim1, subprim1, block2.

Figure 11:
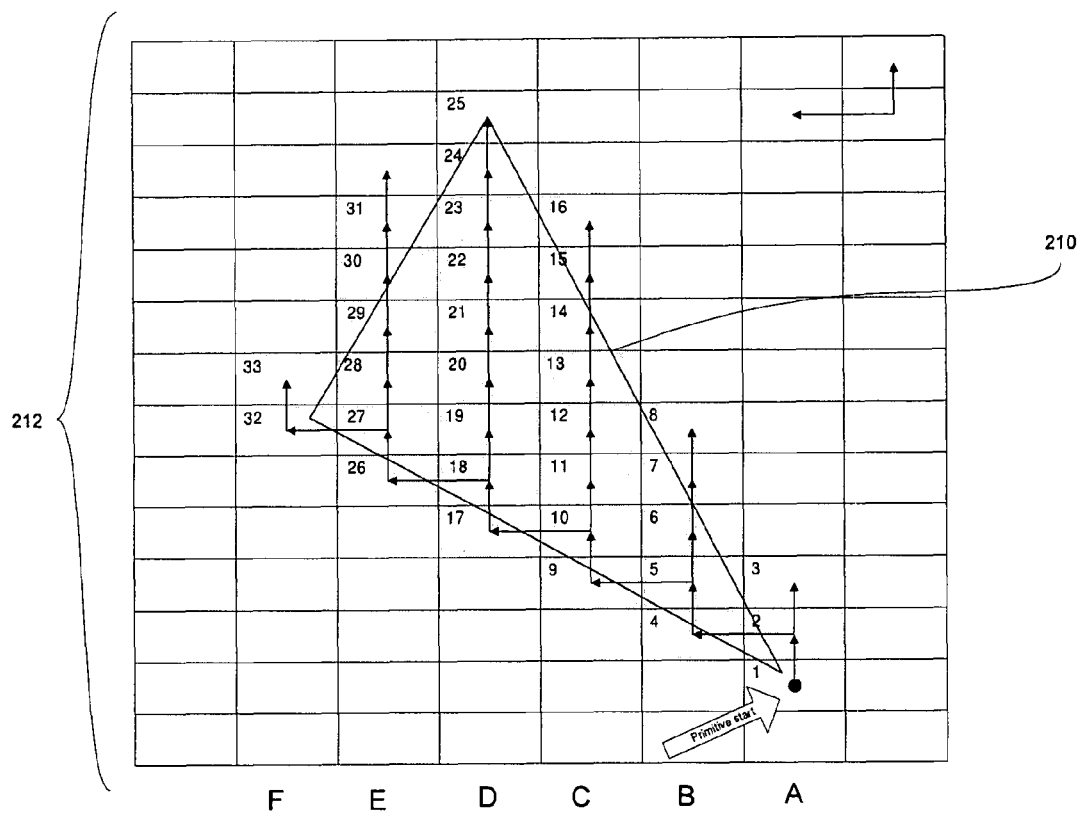
FIG. 11 illustrates a processing sequence for a primitive in accordance with one embodiment.

Referring now to FIG. 11, a processing sequence of a primitive is illustrated in accordance with one embodiment. A primitive 210 is illustrated along with a plurality of blocks 212 that define a screen space. Further, each of the plurality of blocks 212 that include a region of the primitive 210 is uniquely identified, e.g., the blocks 1-33. In this embodiment, the processing of the primitive begins with the processing of a block including a selected vertex of the primitive (e.g., the block 1). The processing proceeds sequentially on a column by column basis. Therefore, the blocks, located in a first column (column A), that include regions of the primitive 210 are all processed, e.g., the blocks 1-3. Following the processing of these blocks, the blocks, located in a second column (column B), that include regions of the primitive 210 are processed (e.g., the blocks 4-8), followed by the processing of the blocks, located in a column C, that include regions of the primitive 210 (e.g., the blocks 9-16), until all the blocks that include the regions of the primitive located in the screen space are processed, e.g., all of the blocks 1-33.

In accordance with the illustrated embodiment, the processing proceeds from a bottom to a top of the relevant portions of a column (i.e., the blocks that include regions of the primitive) before shifting to the adjacent column and beginning a processing of that column from the bottom to the top. The arrows in FIG. 11 illustrate the processing sequence according to this example. As will be recognized by those of ordinary skill in the art, other processing sequences may be employed provided that each block that includes a region of the primitive (e.g., each of the regions that appear in the screen space) is processed.

In accordance with one embodiment, an accelerated processing can result when a context is restored. As mentioned above, a re-processing of one or more regions of a partially processed primitive may not be necessary. For example, the context switch level of the graphics processing system may proceed more rapidly to the region at which the processing of a primitive is interrupted, e.g., the last block that is processed before a context switch, the block that is immediately subsequent (in the processing sequence) the last processed block at which a context switch occurred, etc.

According to one embodiment, a processing of a context is interrupted part way through a processing of a primitive. The context is subsequently restored and some processing levels of the graphics processing system re-process a selected sub-set of regions of the interrupted primitive that were previously processed. That is, some but not all of the previously processed blocks are partially re-processed. In accordance with one embodiment, the blocks included in the selected sub-set are selected because the re-processing of those blocks assures that the results of the processing of the primitive following its interruption are substantially identical to the results of the processing of the primitive without interruption. For example, in one embodiment, the results of processing following an interruption are invariant when compared with the results of an uninterrupted processing of the primitive.

In one embodiment, the processing of the primitive 210 at the context switch level is interrupted following the completed processing of block 20. Accordingly, the processing of regions of the primitive 210 that were not processed prior to the context switch begins at block 21. However, in order to process block 21, some of the dynamic states corresponding to block 20 may be required. Accordingly, in one embodiment, the dynamic states corresponding to block 20 may be obtained by partially re-processing each of the regions included in blocks 1, 2, 4, 5, 9, 10, 17, 18, and 19. These nine blocks are each processed by some levels of the rasterizer and some levels of the modules downstream of the rasterizer to trace the processing sequence illustrated by the arrows in FIG. 11 most directly from block 1 to block 20. According to one embodiment, an accurate computation of the dynamic states of the block 21 results when these selected blocks 1, 2, 4, 5, 9, 10, 17, 18, 19 and 20 are partially re-processed. That is, the result of the computation is invariant when compared with a result of a computation of the dynamic states of block 21 following the processing of each of the blocks 1-20.

In a further embodiment, an algorithm is employed that assures accurate results with a partial processing of a further reduced sub-set of selected blocks. In one embodiment, only those blocks on a diagonal that connect column A (where block 1 is located) to column D (where block 21 is located) and those blocks preceding block 21 in column D are partially re-processed to achieve an accurate computation of the dynamic states of block 21. That is, in this example, only blocks 1, 4, 9, 17, 18, 19 and 20 are re-processed by a selected sub-set of processing levels of the rasterizer and by a selected sub-set of processing levels of the modules downstream of the rasterizer.

In one embodiment, each different context is identified by an identification tag that uniquely identifies the context. In some embodiments, the identification tag may be assigned by an operating system. In other embodiments, a driver may assign the identification tag. In various embodiments, these context identifiers are employed by the graphics processor 20 to avoid switching context when, for example, the first context and the second context are the same context.

In accordance with one embodiment, the request manager keeps a copy of an ID tag of the current context that is being processed by the graphics processing system. According to this embodiment, a request to switch context includes an identification of the "new" context. In a version of this embodiment, the request manager compares the two values (i.e., the ID tag associated with the "current" context and the ID tag associated with the "new" context) and only forwards the request to switch context to the rasterizer when the two values are different.

In accordance with a further embodiment, the above approaches may be employed where context lists are communicated to the graphics processing system. That is, the above approaches may be employed in a system in which the host processor communicates a single context or a list including multiple contexts to the graphics processing system. For example, the host processor may communicate to the graphics processing system a first list A that includes context 1, context 2, context 3 and context 4 for processing in that order. Subsequently, the host processor may communicate to the graphics processing system a second list B that includes context 2, context 4 and context 3 for processing in that order. If for example, the graphics processing system receives the list B for processing while processing context 2 from list A, a context switch will not take place because the request manager determines that the "new" context (i.e., context 2, the first context included in list B) is the same as the "current" context (i.e., context 2 include in list A). However, in this example, the context 4 is processed following the completion of context 2 because list B was communicated to the graphics processing system for immediate processing.

Figure 7:
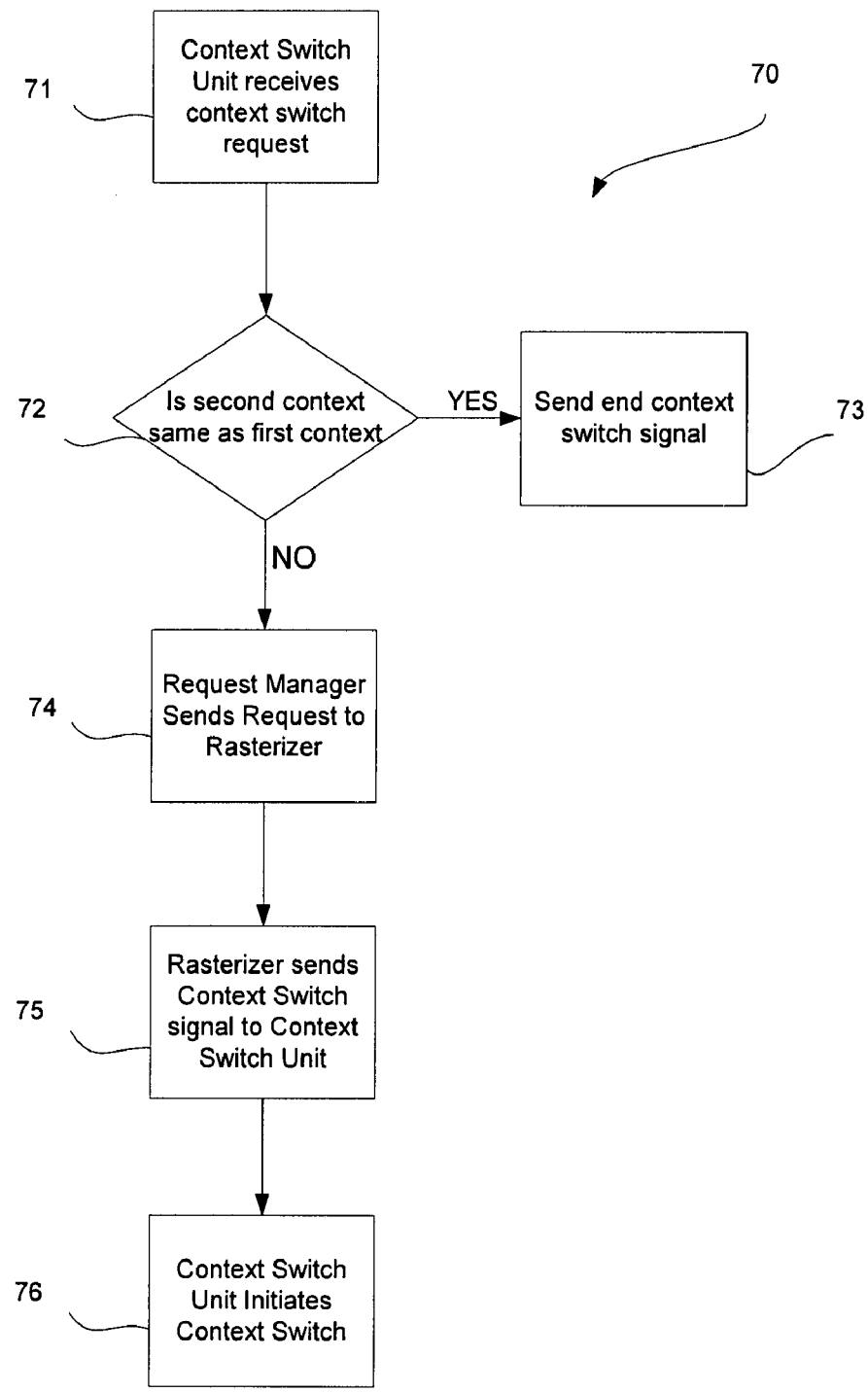
FIG. 7 illustrates a process in accordance with an embodiment of the invention.

Referring now to FIG. 7, a process 70 for context switching is illustrated in accordance with one embodiment. At act 71, a context switch unit (e.g., the context switch unit 30, the context switch unit 120), included in a graphics processing system which is processing a first context, receives a request to switch to a second context. In one embodiment, the context switch unit also receives an identification tag associated with the second context. In a further embodiment, the context switch unit forwards the request to switch context and the associated identification tag to a request manager (e.g., the request manager 43 included in the context switch unit). In a version of this embodiment, the act of forwarding the request to the request manager is included as a separate act in the process 70. At act 72, the request manager 43 compares an identification (e.g., identification tags) of the second context to an identification (e.g., identification tags) of the first context to determine whether the first context and the second context are the same. In one embodiment, the process moves to act 73 where the request manager sends an end of context switch signal to the host computer if the first context (i.e., the then-current context of the graphics processing unit) and the second context are the same. If the identification of the first context and the identification of the second context are different from one another, the process 70 moves to act 74 where the request manager sends a request to switch to the second context. For example, where the context switch level is included in the input assembler, the request manager sends the request to switch context to the rasterizer (e.g., the rasterizer 115).

At act 75, the rasterizer sends a signal to the context switch unit that the context switch is accepted. In one embodiment, the rasterizer completes a processing of a selected region of the primitive after which the processing of the command list (e.g., the command list associated with the first context) is interrupted for the context switch. According to this embodiment, the rasterizer sends the signal to the context switch unit following the completion of the processing of the selected region at the context switch level (e.g. 115A). At act 76, the context switch unit communicates a signal to the request manager that the context switch may be triggered. Further, the rasterizer, which can continue to receive data from the setup engine, starts discarding this data since it is associated with the first command list. Upon receipt of the signal from the context switch unit, the request manager initiates the context switch by saving the first context and restoring the second one.

According to one embodiment, the context switch unit saves the states of the first context. Further, as described above, the rasterizer can accept the context switch at a block-level of granularity. Because the graphics processing system will later resume the first context at that same location in the primitive, the system should save states that allow the system to restore the first context at the correct location of the primitive, i.e., down to a block-level of granularity. Accordingly, static states and dynamic states corresponding to the primitive and block at which the context switch occurs are saved while other data may be flushed. For example, in one embodiment, the saved data includes the static states of the graphics processing system (e.g., static states of all of the modules of the graphics processing system when processing the primitive at which the context switch is made) and the dynamic states of the rasterizer and the input assembler corresponding to the current primitive and the last region of the primitive (e.g., a region included in a block) that is processed in the rasterizer prior to the context switch being made. In different embodiments, dynamic states from the render target engine, the pixel shader and the texture engine might also be saved.

Figure 8:
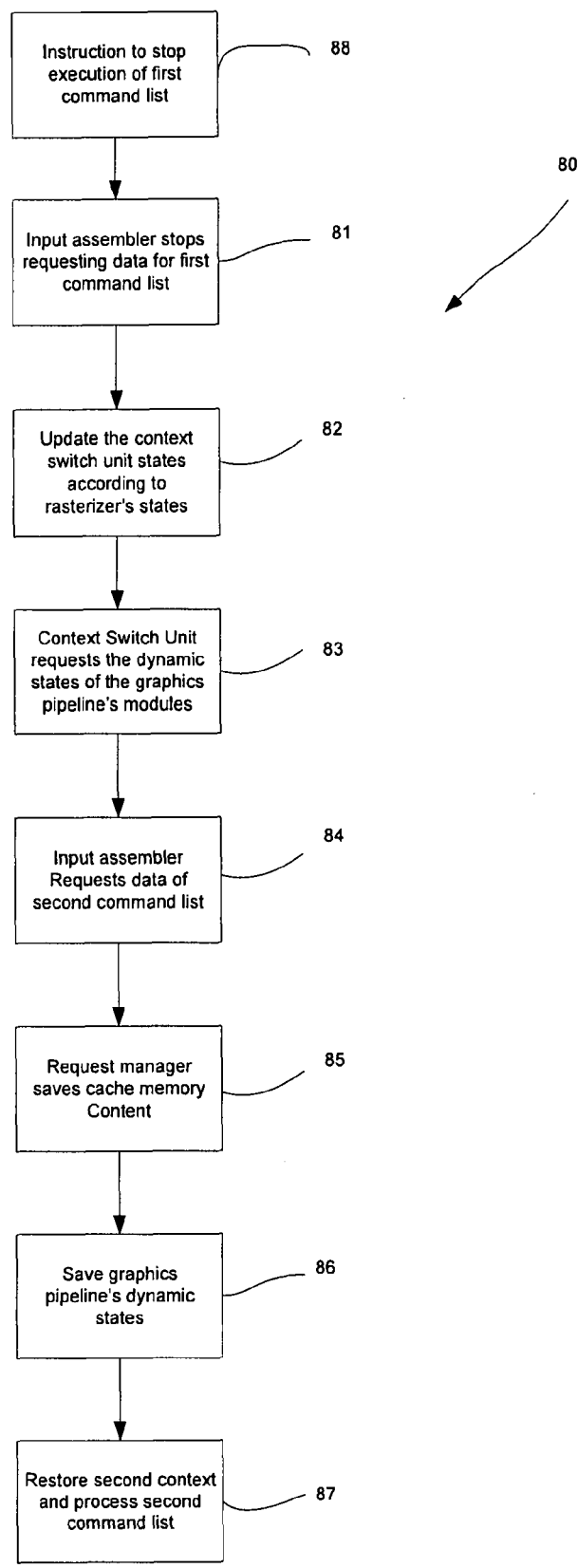
FIG. 8 illustrates another process in accordance with an embodiment of the invention.

FIG. 8 illustrates a process 80 by which a context switch unit can save a first context in accordance with one embodiment. At act 88, the request manager instructs the graphics processing system to stop executing the first command list by communicating the instructions to the input assembler. At act 81, the input assembler terminates execution of the first command list by stopping all data requests for that command list (e.g., for the first context). At step 82, the context switch unit updates its states according to the states of the rasterizer which are associated with the current primitive that is being processed by the rasterizer. In one embodiment, act 82 is accomplished by saving in the cache memory 41 the primitive's states stored in queue in the FIFO 42 provided that the rasterizer has started processing the primitive.

In another embodiment, act 82 is accomplished by saving in the cache memory 41 the primitive's states stored in queue in the FIFO 42 provided that the previous primitive has been completed and signaled as completed by the rasterizer. In a version of this embodiment, the states stored in the cache memory and in tracker are synchronized to the rasterizer's states at the completion of act 82. Thus, these states correspond to the primitive and block being processed in the rasterizer (e.g., at the context switch level) for all the processing modules. In some embodiments, the act 82 is accomplished by saving in local or system memory the primitive's states stored in queue in the FIFO 42 provided that the rasterizer has signaled the completion of the processing of the previous primitive. At act 83, the context switch unit requests the dynamic states of the graphics pipeline corresponding to the primitive and block being processed in the rasterizer.

In accordance with one embodiment, the context switch unit is included in the input assembler. In this embodiment, the input assembler sends a command into the graphics processing pipeline where it is ignored by the vertex shader and clipping engine and executed in the rasterizer. The rasterizer may then forward its dynamic states to the input assembler through an interface. These states are computed by the rasterizer and concern the current or next region of the primitive (e.g., region included in a block). With the dynamic states supplied to the context switch unit, the rasterizer can discard the data concerning the first command list. In accordance with one embodiment, one or more additional processing modules may also forward their dynamic states to the context switch unit.

In one embodiment, the render target engine may forward its dynamic states. As an example of this embodiment, the render target engine may forward its dynamic states in a graphics processing system that employs dedicated buffers (e.g., fragment buffers) to store antialiasing information and where memory in those buffers is allocated dynamically by the graphics processor. In accordance with this embodiment, pointers to free portions of the buffers are dynamic states associated with the first context that can be both saved and restored.

At act 84, the context switch unit (e.g., the request manager 43) instructs the input assembler to start requesting data to process one of the plurality command lists associated with the second context. In addition, at acts 85 and 86, the states of the first context still are saved.

In one embodiment, the saving of the states is handled by the context switch unit which retrieves the states from the cache memory and the tracker and communicates the states to system or local memory via the interface (e.g., the interface 29). The preceding approach may be employed whether the context switch unit is included in the input assembler or external to it. Further, in some embodiments, the context switch unit also retrieves states that are found in various ones of the processing modules and communicates those states to system or local memory.

In the illustrated embodiment, the request manager saves the contents of the cache memory to system or local memory at act 85. At act 86, a plurality of the dynamic states of the graphics processing system are saved. In a version of this embodiment, all the dynamic states of the graphics processing system are saved including the dynamic states of the input assembler. In a further embodiment, cache memory is not included in the context switch unit thus, act 85 is not performed. In this embodiment, the static states of the graphics processing modules are already saved in system or local memory. Further, at act 86, the dynamic states are saved to memory.

During the period when the context switch unit saves the states of the first context, the input assembler may start requesting data for the second context, for example, by beginning with a request for data of a first command list of the second context. In one embodiment, the restoration of the second context is monitored to insure that new data (i.e., the data from the second context) does not overwrite data from the first context that is not yet saved. For example, the rasterizer should not receive data concerning the processing of the second context until it has finished transferring the dynamic states concerning the processing of the first context. In accordance with one embodiment, the input assembler manages the restoration and may temporarily restrict some of the processing modules from accessing data concerning the second context until the process (e.g., the acts 85 and 86) has progressed sufficiently to insure that data is not overwritten.

In accordance with one embodiment, the driver pre-allocates a portion of the system or local memory for the storage of the data from the cache memory and the tracker, i.e., the static states and the dynamic states. In other embodiments, the address at which data is saved may be determined by the context switch unit or provided by the host computer. In a further embodiment, dynamic states of the input assembler (contained in tracker) are saved at the same location as the dynamic states of others of the processing modules, in a format that allows the input assembler to recover them automatically.

In one embodiment, the states that are saved at acts 85 and 86 are a selected sub-set of the states of the processing modules of the graphics processor 20. The saved states may include the static states of all of the processing modules of the graphics processing system (e.g., the processing modules 18) concerning the primitive being processed by the rasterizer at the time of the context switch. Thus, in various embodiments, the static states of modules located upstream of the rasterizer in a graphics pipeline (e.g., the input assembler 111, the vertex shader 112, the clipping engine 113 and the setup engine 114) are saved. Further, these saved states are those concerning the primitive whose processing is interrupted. Therefore, the saved states from these modules (i.e., those concerning the primitive whose processing is interrupted) may differ from the state of these modules at the time of the context switch. That is, at the time of the context switch, the processing modules that precede the rasterizer in the graphics processing system may have already completed the processing of the primitive that is interrupted. Thus, in accordance with various embodiments, one or more of the saved states of processing modules located upstream of the module where the context switch is made are past states. In one embodiment, the saved states may include the static states of the processing modules located downstream of the rasterizer in the graphics pipeline (e.g. the pixel shader 116, the render target engine 117 and the texture engine 118). Further, these saved states are those concerning the primitive whose processing is interrupted.

In one embodiment, the saved states also include dynamic states. For example, the dynamic states of the input assembler 111 may be saved. These dynamic states may be saved in system or local memory to track the processing of the command list. The processing status of the command list can indicate which element(s) of the list are already processed. In addition, selected dynamic states of the rasterizer may be saved. In one embodiment, these selected dynamic states allow the restoration and processing of the first context to resume at a block level. In addition, selected dynamic states of the modules that follow the rasterizer 115 in the graphics processor 20 may be saved to assist in restoring the processing of a primitive at a block level.

At act 87, the second context is restored and the graphics processing system begins processing the second context, i.e., a first command list of the second context. As is recognized by those of ordinary skill in the art, the second context may include a plurality of command lists or only a single command list.

Figure 9:
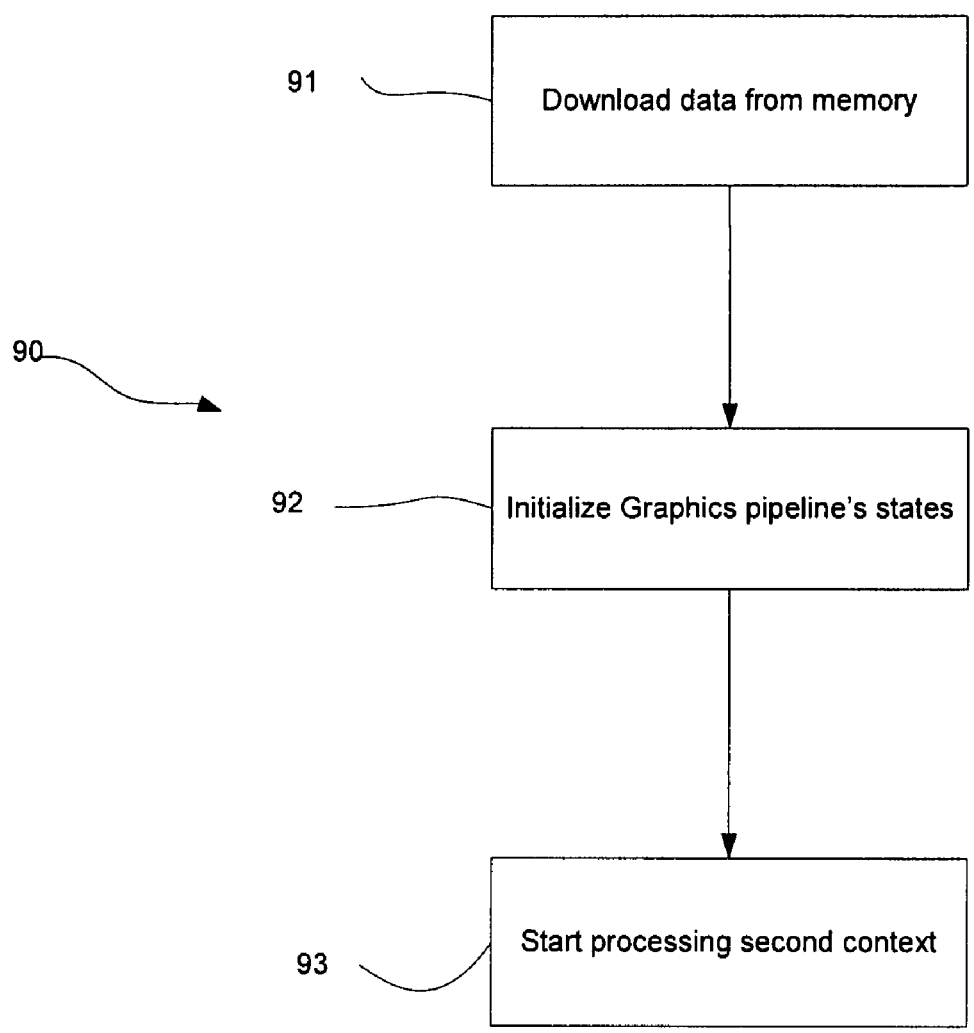
FIG. 9 illustrates yet another process in accordance with an embodiment of the invention.

In accordance with one embodiment, the beginning of the processing of the second context involves further acts as illustrated in FIG. 9. The first command list associated with the second context processed by the graphics processing system after switching from the first context may be a new list or a list that has been previously processed by the graphics engine and interrupted. In both cases the input assembler processes the command list in the same manner according to one embodiment.

In the illustrated embodiment, data concerning the context that is being restored (e.g., the second context) is downloaded from memory to the graphics processing system at act 91. At act 92, the states of the graphics processing unit are initialized for the processing of the second context with the appropriate static and dynamic states. At act 93, the graphics processor starts processing the second context by processing the first command list associated with the second context.

Figure 10:
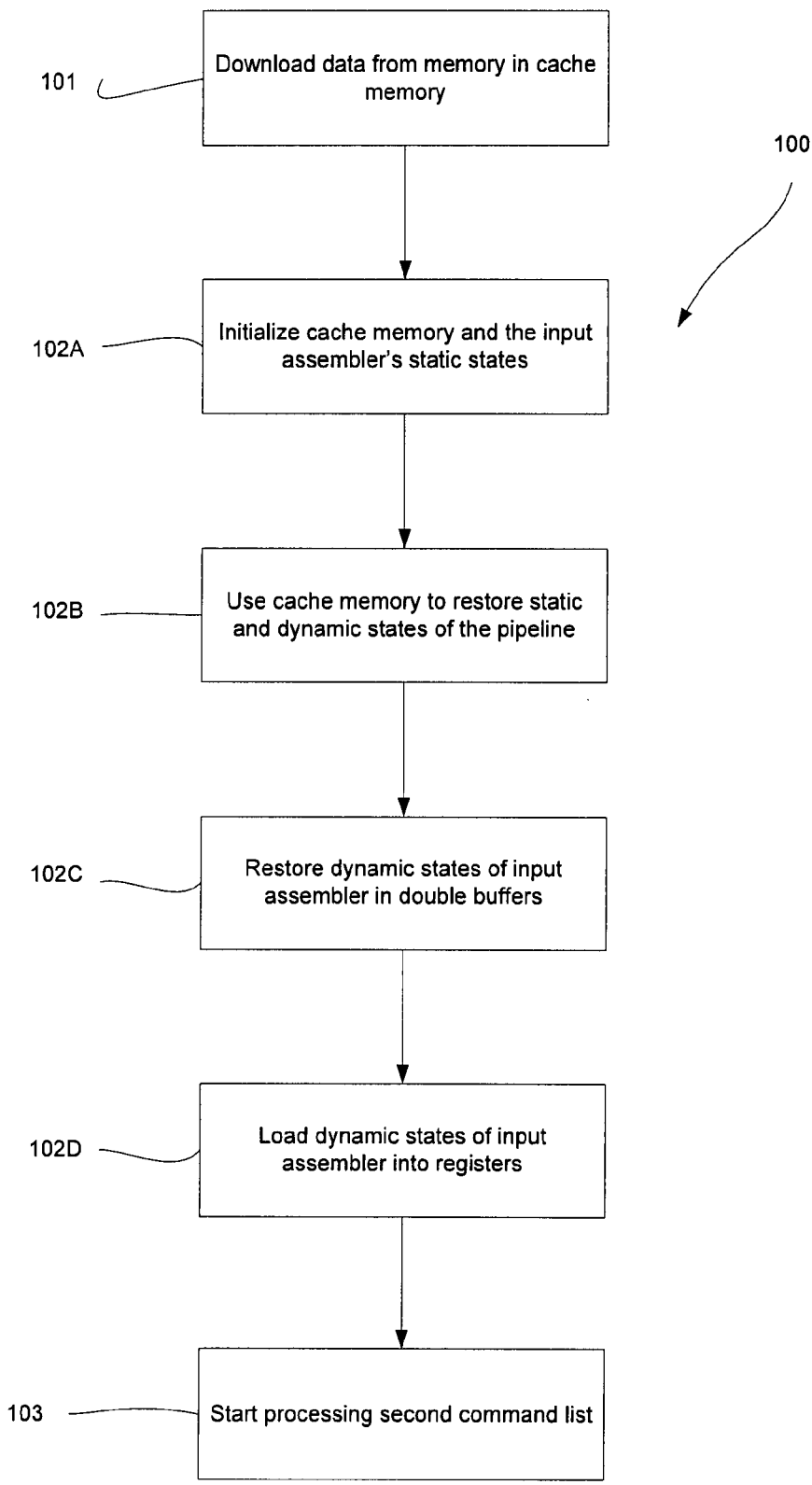
FIG. 10 illustrates still another process in accordance with an embodiment of the invention.

FIG. 10 illustrates a process 100 for restoring a context in accordance with one embodiment. As mentioned previously, the context that is being restored may be a new context or a context that has been previously processed by the graphics engine and interrupted.

In one embodiment, the process 100 is included in the process 80 at the act 87. According to one embodiment, to restore a context, the input assembler executes a bootstrap, a temporary command list, that corresponds to the context that is being restored. Further, the driver may create the bootstrap and allocate the memory space to store the context corresponding to the command list that is being processed. In one embodiment, the bootstrap is program code that is executed by the graphics processing system to restore a context. The bootstrap allows the input assembler to recover all saved states and dispatch them to the appropriate processing module in the graphics processing system. According to one embodiment, the bootstrap is created by the driver for each context associated with a command list sent by the host processor.

In one embodiment, the bootstrap is implemented in software while in an alternate embodiment the bootstrap is implemented in hardware. For example, the input assembler may include a dedicated circuit that handles the save and restore sequence of data.

At act 101, the input assembler reads the saved data from memory. At step 102A, the static states of the cache memory and the input assembler are initialized. In one embodiment, the static states are initialized in the cache memory before the states are dispatched to the graphics processing modules to insure that the states are restored in the correct order for processing. In an alternate embodiment, states are read and transferred to the appropriate processing module without first restoring the states to the cache memory. In one embodiment, at act 102B, the cache memory is used to restore static and dynamic states of the downstream modules. In a further embodiment, at act 102C, the dynamic states of the input assembler are downloaded and put in double buffers. According to this embodiment, the input assembler first executes the bootstrap and then executes the first command list of the second context (i.e., the context being restored in this example). Accordingly, double buffers can be used to contain the states of the dynamic registers of the input assembler, i.e., to contain the states of the bootstrap and the states of the next context.

At act 102D, the dynamic states of the restored context are loaded into the active registers of the input assembler to complete the context switch. At act 103, the graphics processing system starts the processing of the first command list associated with the second context.

As a further example, in one embodiment, where the first command list of the second context has been previously interrupted, the input assembler forwards the primitive at which the context switch previously occurred to the vertex shader as part of the processing of the first command list. The vertex shading and clipping may be performed on the primitive. Although the processing of the primitive may have been previously executed by the processing modules upstream of the rasterizer (e.g., the vertex shader, the clipping engine and the setup engine), the dynamic states associated with that processing were not saved. Consequently, in this embodiment, the shading, clipping and setup are performed twice for this primitive. However, the rasterizer does not perform the processing twice. According to one embodiment, the rasterizer identifies the first region of the primitive that was not previously processed and begins the processing at that region in accordance with the dynamic states that are restored. In another embodiment, some processing levels of the rasterizer may re-process a selected set of blocks including regions of the primitive that were previously processed. In a version of this embodiment, the rasterizer may partially reprocess selected regions of the primitive to assure that the processing of the interrupted primitive has the same computational precision as the processing of an uninterrupted primitive.

According to one embodiment, during a context restore, access to the cache memory is disabled as soon as data concerning the context that is being restored is downloaded from local or system memory. According to one embodiment, the input assembler 111 disables the access to the cache memory, to protect the restored data from being altered during the execution of the bootstrap. In another embodiment, the context switch unit disables access to the cache memory to protect the restored data from being altered.

In one embodiment, the content of the cache memory may be restored first during a restore. Further, a special command can be used to push the states from the cache memory to the graphics processing modules to restore a context. This approach may allow the driver to determine a restore order at that time the context is restored. Further, a memory macro may be employed to regroup the states in a cache memory. The macro can be optimized to decrease the area on the graphics chip required to store the states of the different modules and to increase the speed of the restoration.

As is provided in some examples above and as should be apparent to those of ordinary skill in the art, the processes 70, 80, 90 and 100 may vary in different embodiments. For example, the processes may include additional steps, fewer steps and steps that include multiple acts described concerning the processes.

As described herein, various embodiments provide for immediate context switching in a graphics processing system. In one embodiment, the graphics processing system receives a request to process a second command list associated with a second context while it is processing a first command list associated with a first context. The graphics engine can switch immediately from the first context and the first command list to the second context and the second command list.

In another embodiment, the graphics processing system may automatically switch context in response to an internal condition. For example, the rasterizer may contain a plurality of counters that enumerate, for example, the number of primitives, the number of blocks, or the number of states that the rasterizer processes.

The command list may then include instructions to the rasterizer to trigger a context switch if one of these counters satisfies a pre-determined condition. The command list may also include the next context identification tag. When the condition is satisfied, the rasterizer can send a context switch interrupt to the context switch unit. The current context may be saved and the next context restored as described above.

Thus, embodiments may improve the performance of real-time applications. Further, some embodiments are capable of switching from a first context to a second context within a pre-defined maximum amount of time. For example, in one embodiment, a context switch is performed within 5 µs.

According to some embodiments, the graphics processing system may be setup to accept or ignore a request to switch context. For example, a driver may program a state of the graphics processing system to force the context switch unit to ignore a request to switch context. In one embodiment, the rasterizer may verify that the context switch is enabled before accepting the context switch. In a further embodiment, the context switch unit may be disabled to avoid switching context during the execution of a critical section of a command list.

Variations of the above-described embodiments may include saving data of a graphics processing system, including static and dynamic states, in a different order than described above. For example, in one embodiment, the input assembler may wait to receive all dynamic states of the graphics processing system before initiating a saving of the data. Further in some embodiments, all of the saved states may be put in the cache memory before the data is transferred to local or system memory.

Restoring a second context may be accomplished by a variety of approaches. For example, as described above, the second context may be restored while the first context is being saved. In an embodiment of the invention, the input assembler may restore the second context as soon as the graphics processing system has stored the states of the first context in the cache memory (static states) and the tracker (dynamic states). In another embodiment, the input assembler may restore the second context as soon as the input assembler is synchronized with the states of the rasterizer. In yet another embodiment, the input assembler may restore the second context only when the graphics processing system finishes saving the first context in system memory.

In addition, a variety of approaches may be used to restore data from memory and distribute it to the processing modules in embodiments of the invention. That is, the restore process may be programmable such that the states may be restored in a different sequence according to the new context. Further, in some embodiments, a bootstrap may be employed to interpret saved states. In an alternate embodiment, the bootstrap is not used, for example, where the command list is new, e.g., it was never executed nor interrupted before by the graphics engine.

Further, embodiments of the invention can provide for the saving and restoration of context (and associated command lists) with a reduced amount of saved data because, for example, static states and relatively few dynamic states are saved. According to one embodiment, the graphics processing system minimizes the quantity of dynamic states that have to be saved by switching context at a block level of a primitive. As a result, various embodiments can reduce the amount of memory that is required to store the states used to restore a context.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of processing, with a graphics processing system including a first module and a second module located upstream of the first module in the system, a primitive associated with a first context, the primitive comprising a plurality of regions, the method comprising acts of:
   receiving, by the first module, data concerning the primitive from the second module following a processing of the primitive by the second module;
   receiving a request to process a command list associated with a second context;
   interrupting, before completion, a processing of the primitive associated with the first context by the first module upon completion of a processing by the first module of at least a first region selected from among the plurality of regions;
   saving a state of the second module, wherein the state corresponds to the state of the second module when the second module processed the primitive associated with the first context; and
   processing at least a part of the command list associated with the second context.

2. The method of claim 1, further comprising an act of restoring a state of the processing of the command list associated with the second context before processing the command list.

3. The method of claim 2, wherein the act of restoring a state of the processing of the command list includes acts of restoring a state of the first module and restoring a state of the second module, wherein the state of the first module includes information concerning a region of a second primitive included in the command list associated with the second context, and wherein the region of the second primitive was not previously processed by the first module.

4. The method of claim 3, wherein the act of processing at least a part of the command list associated with the second context includes acts of:
   discarding at least one region of the second primitive that was previously processed; and
   processing, by the first module, the region of the second primitive that was not previously processed.

5. The method of claim 1, wherein the primitive associated with the first context is a first primitive, and wherein the method further comprises the acts of:
   processing a second primitive associated with the first context before processing the first primitive, wherein the second primitive includes a plurality of regions including a first region and a last region; and
   during the processing of the last region by the first module, storing a state of the first module corresponding to the state of the first module when processing the first primitive.

6. The method of claim 5, further comprising an act of saving the state of the first module when the processing of the primitive associated with the first context is interrupted, wherein the graphics processing system includes a memory, and wherein the state of the first module and the state of the second module are saved in the memory.

7. The method of claim 1, further comprising an act of saving a state of the first module, wherein the state corresponds to the state of the first module when processing the primitive associated with the first context.

8. The method of claim 7, further comprising an act of identifying a second region of the primitive for which the first module has not started processing before the processing of the primitive associated with the first context is interrupted.

9. The method of claim 8, further comprising acts of:
   restoring the state of the first module and the state of the second module;
   partially reprocessing, by the first module, at least a portion of the primitive that includes the first region; and
   processing, by the first module, the second region of the primitive associated with the first context.

10. The method of claim 1, further comprising an act of identifying a plurality of areas of a display, wherein each of the respective areas of the display comprise at most one of the plurality of regions.

11. The method of claim 1, further comprising an act of identifying a plurality of sub-primitives, wherein each of the respective sub-primitives corresponds to different one of the plurality of regions.

12. The method of claim 1, further comprising acts of:
identifying the first context with a first identification tag;
identifying the second context with a second identification tag;
determining whether the first identification tag and the second identification tag are the same; and
continuing the processing of the primitive associated with the first context without interruption if the first identification tag and the second identification tag are the same.

13. A graphics processing system configured to switch from a processing of a primitive associated with a first context to a processing of a command list associated with a second context, the primitive comprising a plurality of regions, the system comprising:
a plurality of processing modules, wherein at least one module of the plurality of processing modules is configured to receive a request to switch to the second context, the plurality of processing modules including:
a first module that is configured to, following a receipt of the request by the at least one module, to complete a processing of at least one region selected from among the plurality of regions before interrupting the processing of the primitive prior to completion and processing at least a part of the command list associated with the second context; and
a second module that is configured to provide data concerning the primitive to the first module following a processing of the primitive by the second module; and
a memory configured to save a state of the second module, wherein the state corresponds to the state of the second module when processing the primitive associated with the first context.

14. The graphics processing system of claim 13, wherein the first module is configured to receive the request to switch to the second context.

15. The graphics processing system of claim 13, wherein the memory is configured to save both information concerning static states of the at least one of plurality of processing modules and dynamic states of the at least one of plurality of processing modules.

16. The graphics processing system of claim 13, further comprising:
a rasterizer; and
a context switch unit coupled to the rasterizer, wherein the context switch unit is configured to communicate the request to switch to the second context to the rasterizer.

17. The graphics processing system of claim 16, further comprising an input assembler included in the second module, wherein the rasterizer is included in the first module.

18. The graphics processing system of claim 13, wherein the memory is configured to save a state of the first module, wherein the state corresponds to the state of the first module when processing the primitive associated with the first context.

19. The graphics processing system of claim 18, wherein the state information includes state information corresponding to the at least one region selected from among the plurality of regions, wherein the graphic processing system is configured to restore the state of the first module and the state of the second module, and wherein the first module is configured to discard without reprocessing at least a part of the primitive that was processed before the processing was interrupted.

20. The graphics processing system of claim 13, further comprising a cache memory configured to store state information concerning states of at least some of the plurality of processing modules when processing the primitive.

21. The graphics processing system of claim 20, further comprising a context switch unit that includes the cache memory and a FIFO coupled to the cache memory, wherein the FIFO is configured to communicate state information to the cache memory.

22. The graphics processing system of claim 21, wherein state information stored in the FIFO is communicated to the cache memory when the first module provides an indication that the primitive has been accepted by the first module for processing.

23. The graphics processing system of claim 13, further comprising a graphics processor that includes the first module and the second module.

24. A graphics processing system configured to switch from a processing of a primitive associated with a first context to a processing of a command list associated with a second context, the primitive comprising a plurality of regions, the system comprising:
a plurality of processing modules including:
a rasterizer that is configured to receive a request to switch to the second context from a context switch unit, and following a receipt of the request, to complete a processing of at least one region selected from among the plurality of regions before interrupting the processing of the primitive prior to completion and processing at least a part of the command list associated with the second context; and
a second module that is configured to provide data concerning the primitive to the rasterizer following a processing of the primitive by the second module; and
a memory configured to save a state of the second module, wherein the state corresponds to the state of the second module when processing the primitive associated with the first context.

25. A graphics processing system configured to switch from a processing of a primitive associated with a first context to a processing of a command list associated with a second context, the primitive comprising a plurality of regions, the graphics processing system comprising:
a plurality of processing modules configured in a graphics pipeline, wherein at least one module of the plurality of processing modules is configured to receive a request to switch to the second context, the plurality of processing modules including:
a first module that is configured to, following a receipt of the request by the at least one module, to complete a processing of at least one region selected from among the plurality of regions before interrupting the processing of the primitive prior to completion and processing at least a part of the command list associated with the second context; and
a second module located upstream of the first module in the graphics pipeline, the second module configured to provide data concerning the primitive to the first module following a processing of the primitive by the second module; and
a memory configured to save a state of the second module, wherein the state corresponds to the state of the second module when processing the primitive associated with the first context.

26. A graphics processing system configured to switch context, the system comprising:

a rasterizer configured to process a primitive associated with a first context, wherein the primitive comprises a plurality of regions; and a context switch unit coupled to the rasterizer and configured to save a state of the rasterizer when processing the primitive, wherein the rasterizer is further configured to, following a receipt of a request to switch to a second context, complete a processing of at least one region selected from among the plurality of regions before interrupting a processing of the primitive and beginning a processing of a command list associated with the second context.

27. The graphics processing system of claim 26, wherein the graphics processing system is configured to partition a screen space into a plurality of areas and each one of the plurality of areas comprises at most one region from the plurality of regions of the primitive.

28. The graphics processing system of claim 27, wherein the areas have a rectangular shape.

29. The graphics processing system of claim 26, wherein the context switch unit includes a cache memory.

30. The graphics processing system of claim 26, further comprising an input assembler, wherein the context switch unit is coupled to the input assembler.

31. The graphics processing system of claim 26, further comprising a tracking module configured to identify an element from a command list that is to be processed by the rasterizer.

* * * * *